US007643667B2

(12) United States Patent
Kusakari

(10) Patent No.: US 7,643,667 B2
(45) Date of Patent: Jan. 5, 2010

(54) IMAGE RECORDING APPARATUS, AND ABNORMAL RECORDING ELEMENT DETERMINATION METHOD

(75) Inventor: Tsutomu Kusakari, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 732 days.

(21) Appl. No.: 11/224,944

(22) Filed: Sep. 14, 2005

(65) Prior Publication Data

US 2006/0056699 A1 Mar. 16, 2006

(30) Foreign Application Priority Data

Sep. 15, 2004 (JP) ............................. 2004-268591

(51) Int. Cl.
*G06K 9/00* (2006.01)
*G06K 9/46* (2006.01)

(52) U.S. Cl. ....................................... 382/149; 382/190

(58) Field of Classification Search ................. 382/149, 382/190, 254, 310, 141; 358/296; 347/40, 347/41, 47; 348/92, 125
See application file for complete search history.

(56) References Cited

U.S. PATENT DOCUMENTS 6,333,992 B1 * 12/2001 Yamamura et al. .......... 382/149
6,932,454 B2 * 8/2005 Suzuki et al. ................. 347/12
2003/0085947 A1 5/2003 Suzuki et al.

FOREIGN PATENT DOCUMENTS

JP 5-301427 A 11/1993
JP 6-297728 A 10/1994
JP 7-327124 A 12/1995
JP 2003-145734 A 5/2003

* cited by examiner

*Primary Examiner*—Daniel G Mariam
(74) *Attorney, Agent, or Firm*—Birch, Stewart, Kolasch & Birch, LLP

(57) ABSTRACT

The image recording apparatus comprises: a recording device having a plurality of recording elements which record an image onto a recording medium; an extraction device which extracts a region satisfying a prescribed extraction condition according to information of the image recorded on the recording medium by the recording device; a reading device which reads in the image recorded on the recording medium and accordingly outputs read information; and a recording element abnormality determination device which determines abnormalities of the recording elements corresponding to the image in the extracted region extracted by the extraction device according to the read information of the region extracted by the extraction device.

6 Claims, 17 Drawing Sheets

IMAGE RECORDING APPARATUS, AND ABNORMAL RECORDING ELEMENT DETERMINATION METHOD

BACKGROUND OF THE INVENTION

1. Field of the Invention

The present invention relates to an image recording apparatus and an abnormal recording element determination method, and more particularly to a technology for determining a state of recording elements in an image recording apparatus which records images onto a recording medium.

2. Description of the Related Art

In recent years, inkjet recording apparatuses have come to be used widely as data output apparatuses for outputting images, documents, or the like. By driving recording elements, such as nozzles, provided in a recording head in accordance with data, an inkjet recording apparatus is able to form data onto a recording medium, such as a recording paper, by means of ink ejected from the nozzles.

If an abnormality has occurred in a recording element provided in the recording head, there is occurrence of a dot omission in which a dot that should have been formed is not formed, occurrence of a dot abnormality in which a dot of a different shape (and size) to the dot that should have been formed is formed, or occurrence of a dot position abnormality in which the position at which the dot is formed is displaced. In particular, if there is an abnormality in a particular recording element of a full line type recording head which has a row of recording elements (nozzle row) of a length corresponding to the printable width of the recording medium, banding aligned with the conveyance direction of the recording medium may appear in the recorded image, thereby causing the image quality to decline markedly.

In an image recording apparatus such as an inkjet recording apparatus, image quality is maintained by performing restoration of the recording elements and/or correcting dot abnormalities according to a result of rapidly determining abnormalities in recording elements.

One method for determining abnormalities in recording elements is known in which a test pattern formed on the recording medium is read in by means of a CCD or other sensors, and then the presence of an abnormality is determined by comparing the results read in with the test pattern data.

In a barcode recording apparatus disclosed in Japanese Patent Application Publication No. 2003-145734, a test pattern recorded by a recording head is read in by a scanner which is provided on the downstream side of the recording head, and defective nozzles identified from the read results are recorded in a recording device, thereby changing the image contents according to the recorded information.

In a recording apparatus disclosed in Japanese Patent Application Publication No. 6-297728, an ejection failure determination pattern is recorded on recording paper using ink ejected from ejection ports of a recording head, the recording density is determined by means of a photosensor, and any ejection ports producing ejection faults are identified according to the determination results.

In an image recording method, apparatus, recording material, and processed good thereof disclosed in Japanese Patent Application Publication No. 5-301427, during multi-pass printing by shuttle scanning, an image is read in by a sensor which reads in recorded images, and recording abnormalities are determined by comparing the read results with the print data so that compensation is made by altering the subsequent scanning or drive period in the multi-pass operation after the determining process.

However, in the barcode recording apparatus disclosed in Japanese Patent Application Publication No. 2003-145734 and the recording apparatus disclosed in Japanese Patent Application Publication No. 6-297728, a test pattern for determining abnormalities in the nozzles and ejection holes is required. When abnormalities in the recording elements are determined by using a test pattern, it is necessary to form a test pattern on a recording medium, thereby generating wasted recording medium. In addition, during the processes of forming and reading in the test pattern, the recording operation must be halted, so that the reproduction efficiency declines.

Furthermore, in the image recording method, apparatus, recording material, and processed good thereof disclosed in Japanese Patent Application Publication No. 5-301427, although a composition is adopted in this manner that the compensation is carried out in subsequent scans of the recording head when a recording fault is identified, it is not possible to correct recording faults in single-pass recording by means of a full line type recording head.

SUMMARY OF THE INVENTION

The present invention has been contrived with the foregoing circumstances in view, an object thereof being to provide an image recording apparatus and an abnormal recording element determination method that can determine abnormalities in recording elements without using a test pattern formed separately to a recorded image.

In order to attain the aforementioned object, the present invention is directed to an image recording apparatus comprising: a recording device having a plurality of recording elements which record an image onto a recording medium; an extraction device which extracts a region satisfying a prescribed extraction condition according to information of the image recorded on the recording medium by the recording device; a reading device which reads in the image recorded on the recording medium and accordingly outputs read information; and a recording element abnormality determination device which determines abnormalities of the recording elements corresponding to the image in the extracted region extracted by the extraction device according to the read information of the region extracted by the extraction device.

According to the present invention, a region satisfying prescribed extraction conditions suitable for reading in the recorded image (the actual image) by a reading device is extracted from the image according to the image information of the image recorded on the recording medium, and then abnormalities in recording elements corresponding to the extracted region are determined from the read information for the extracted region. Therefore, it is possible accurately to determine abnormalities in recording elements, and furthermore, signal processing and calculational processing can be conducted at high speed.

Furthermore, the prescribed extraction conditions may include parameters such as the recording density (dot density), recording rate (dot coverage rate), dot-to-dot distance (the distance between dot edges), dot size, dot density, and the density of the recording material (such as the ink, in the case of an inkjet recording apparatus), dot bleeding, and the like. Therefore, the extraction conditions can be specified by setting threshold values for those parameters.

As the mode for reading in the image by means of the reading device, a composition may be adopted in which a selection device which selects a region extracted by an extraction device from the read region is provided so as to read in the selected region. Furthermore, a composition may also be adopted in which only the extracted region extracted by the extraction device is read in.

Here, the term “image” does not only refer to a picture or photograph, but rather denotes an image in a broad sense, including text, line drawings, dots, and the like.

Furthermore, the term “image information” includes dot data (dot arrangement data) indicating the arrangement (position, coordinates) of the dots forming the image, and the size of the dots.

Moreover, the term “recording medium” indicates a medium which receives recording by means of a recording device, and this term includes various types of media, irrespective of material and size, such as continuous paper, cut paper, sealed paper, resin sheets, such as OHP sheets, film, cloth, and other materials. The “recording medium” may also be referred to as “recording media, print medium, image forming medium, and so on.

Additionally, the term “recording device” includes a recording head which records images onto a recording medium by means of ink, or light irradiated from an LED.

Providing a reading region setting device which sets the region read by the reading device in the image recording apparatus, the reading region setting device sets the region extracted by the extraction device as the reading region. If the reading device is controlled in such a manner that it reads in the image (dots) of the extracted region while ignoring the image in the other regions, then the reading efficiency (determination efficiency) can be improved.

Furthermore, if a read information selection device which selects all or a portion of the read information obtained by the reading device is provided, and the read information for the region extracted by the extraction device is selected from the read information for all (or a portion) of the image, in such a manner that processing is carried out to the selected read information, then it is possible to improve the efficiency of processing the read information.

Incidentally, as the reading device, it is possible to use a line sensor (area sensor) in which photoelectric transducers, such as CCD or CMOS, is arranged. Furthermore, the reading device may be color-compatible or it may be a monochrome device.

In order to attain the aforementioned object, the present invention is directed to an image recording apparatus comprising: a recording device having a plurality of recording elements which record an image onto a recording medium; an image information modification device which modifies information of the image recorded on the recording medium by the recording device so that the information of the image satisfies a prescribed condition; a reading device which reads in the image recorded on the recording medium and accordingly outputs read information; and a recording element abnormality determination device which determines abnormalities of the recording elements corresponding to the image in the region modified the information of the image by the image information modification device according to the read information of the region.

According to the present invention, the image information is modified on the basis of the image information of the image to be recorded on the recording medium, in such a manner that it satisfies a prescribed condition suitable for reading the recorded image (the actual image) by the reading device, and then abnormalities of the recording elements corresponding to the region of the modified image are judged according to the read information for the region of the modified image. Therefore, it is possible to expect the improved efficiency and accuracy relating to determining recording element abnormalities.

In order to the aforementioned object, the present invention is directed to an image recording apparatus comprising: a recording device having a plurality of recording elements which record an image onto a recording medium; an extraction device which extracts a region satisfying a prescribed extraction condition according to information of the image recorded on the recording medium by the recording device; an image information modification device which modifies information of the image recorded on the recording medium by the recording device so that the information of the image satisfies a prescribed condition; a reading device which reads in the image recorded on the recording medium and accordingly outputs read information; and a recording element abnormality determination device which determines abnormalities of the recording elements corresponding to the image in at least one of the extracted region extracted by the extraction device and a modified region modified the information of the image by the image information modification device according to at least one of the read information of the extracted region and the read information of the modified region.

The present invention is also directed to the image recording apparatus wherein the image information modification device modifies the information of the image by changing positions of dots constituting the image in a non-extracted region which is a region except for the extracted region.

According to the present invention, the image information is modified in such a manner that an extraction condition suitable for reading the recorded image is satisfied by moving dots in the non-extracted region lying outside the extracted region extracted by the extraction device. Therefore, since the extraction device takes the extracted region to be the region which newly satisfies the extraction condition as a result of modifying the image information (by changing the extracted region), it is possible to determine abnormalities in the recording elements. In addition, it is also possible to broaden the extracted region, and to increase the number of recording elements for which abnormality determination is carried out, thereby avoiding situations in which abnormality determination is not carried out in respect of particular recording elements.

Incidentally, the modification may also include a mode in which a new extraction region is added if the image does not initially contain an extraction region which satisfies the extraction condition.

The present invention is also directed to the image recording apparatus wherein the image information modification device modifies the information of the image by adding dots within the extracted region.

According to the present invention, since dots which are not contained in the image information are added to the extraction region, it is possible further to increase the number of recording elements for which abnormality determination is carried out, as well as determining abnormalities in certain specific recording elements.

In this case, dots may be added within the extracted region, or may be added in a region that the image information has been modified by moving the dots in the non-extracted region, in order to satisfy the extraction condition.

The present invention is also directed to the image recording apparatus wherein the image information modification device modifies the information of the image by deleting dots constituting the image within the extracted region.

Accordingly, the abnormality determination may also be carried out in respect of recording elements corresponding to an image of densely placed dots.

The present invention is also directed to the image recording apparatus wherein the image information modification device modifies the information of the image so that dots constituting the image are formed by using the recording elements which have not been scheduled for use.

According to the present invention, since the dots are formed by using recording elements which have not been scheduled for use in recording, it is possible to determine abnormalities in nozzles which have not been scheduled to perform recording, according to the read information for the dots.

The present invention is also directed to the image recording apparatus further comprising: a selection device which selects the recording elements in which abnormality is determined according to information relating to the recording elements, wherein the recording element abnormality determination device determines abnormalities of the recording elements according to the read information of dots in the read information of the image, the dots having been formed by the recording elements which are selected by the selection device.

According to the present invention, the recording elements which are to perform abnormality determination are selected according to information relating to the recording elements, and abnormality determination is performed with respect to the selected recording elements. Therefore, since abnormality determination can be prioritized in respect of recording elements which are considered liable to produce abnormalities, such as recording elements which have produced abnormalities in the past, then it is possible to improve determination efficiency, and to reduce decline in the operating rate due to the occurrence of abnormalities in the recording elements.

Incidentally, a recording element information recording device may be provided so that information relating to the recording elements is recorded previously. Furthermore, a recording information management device also may be provided so that the recorded information is managed (updated) in the recording element information storage device.

The present invention is also directed to the image recording apparatus wherein the extraction device extracts the region satisfying the extraction condition that a distance between edges of mutually adjacent dots forming the image is not less than ½ of diameter of each of the dots according to the information of the image.

According to the present invention, since the extraction condition is set in accordance with the distance between the edges of mutually adjacent dots, then it is possible reliably to read in the dots that are to be read (determined), and therefore improvements in reading accuracy can be expected.

In a case in which dots having different diameters are mutually adjacent, it is possible to prevent determination accuracy from declining by specifying the extraction condition according to the diameter of the larger dots. On the other hand, it is also possible to prevent determination efficiency from declining by specifying the extraction condition according to the diameter of the smaller dots.

The present invention is also directed to the image recording apparatus wherein: each of the recording elements comprises: a plate having an ejection aperture which ejects droplets of a liquid onto the recording medium; a liquid chamber which accommodates the liquid to be ejected from the ejection aperture; an ejection side flow channel which connects the ejection aperture with the liquid chamber; and a supply side liquid flow channel which supplies the liquid to the liquid chamber, and the recording device includes a recording head having the recording elements.

According to the present invention, the recording head may be a full line type recording head in which recording elements are arranged through a length corresponding to the maximum width of the recording medium, or may be a serial type ejection head (shuttle scanning type recording head) which records images on a recording medium by moving in the breadthways direction of the recording medium, or may be a short head in which recording elements are arranged through a length that is shorter than a length corresponding to the full width of the recording medium.

In addition, a full line ejection head may be formed to a length corresponding to the full width of the recording medium by combining a plurality of short heads having rows of recording elements which do not reach a length corresponding to the full width of the recording medium so that those short heads are joined together in a staggered matrix fashion.

Moreover, the present invention also provides a method for attaining the aforementioned objects. More specifically, the present invention is directed to an abnormal recording element determination method for an image recording apparatus comprising a recording device having a plurality of recording elements which record an image onto a recording medium, the method comprising the steps of: extracting a region satisfying a prescribed extraction condition according to information of the image recorded on the recording medium by the recording device; reading in the image recorded on the recording medium; outputting read information obtained at the reading step; and determining abnormalities of the recording elements corresponding to the image in the extracted region according to the read information of the extracted region extracted at the extracting step.

In order to attain the aforementioned object, the present invention is directed to a method of determining an abnormal recording element for an image recording apparatus comprising a recording device having a plurality of recording elements which record an image onto a recording medium, the method comprising the steps of: modifying information of an image recorded onto the recording medium by the recording device so that the information of the image satisfies a prescribed condition; reading in the image recorded on the recording medium; outputting read information obtained at the reading step; and determining abnormalities of the recording elements corresponding to the image in the region modified the information of the image according to the read information of the region modified the information of the image at the modifying step.

In order to attain the aforementioned object, the present invention is directed to an abnormal recording element determination method for an image recording apparatus comprising a recording device having a plurality of recording elements which record an image on a recording medium, the method comprising the steps of: extracting a region satisfying a prescribed extraction condition according to information of the image recorded on the recording medium by the recording device; modifying the information of the image so that the information of the image satisfies a prescribed condition; reading in the image recorded on the recording medium; outputting read information obtained at the reading step; and determining abnormalities of the recording elements corresponding to the image in at least one of the extracted region extracted at the extracting step and a modified region modified the information of the image at the modifying step according to at least one of the read information of the extracted region and the read information of the modified region.

According to the present invention, a region suitable for reading in image by a reading device is extracted from the image information of a recorded image, and abnormalities in the recording elements are determined according to the read information for the extracted region, from the read information obtained by the reading device. Therefore, it is possible accurately to read in the dots corresponding to the recording elements for which abnormality determination is performed, and to speed up processing of the read information. In addition, it is possible to simplify the composition of the processing device which processes the image information, and to satisfactorily determine abnormal recording elements in swift and accurate fashion.

Instead of extracting the extracted region, abnormalities in the recording elements may be determined by reading in the image corresponding to the region in which the image information has been modified in such a manner that a condition corresponding to the extraction condition of the extracted region is satisfied, and also may be determined by performing either extracting of the extracted region and modifying of the image information.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Inkjet Recording Apparatus (Image Recording Apparatus)

Figure 1:
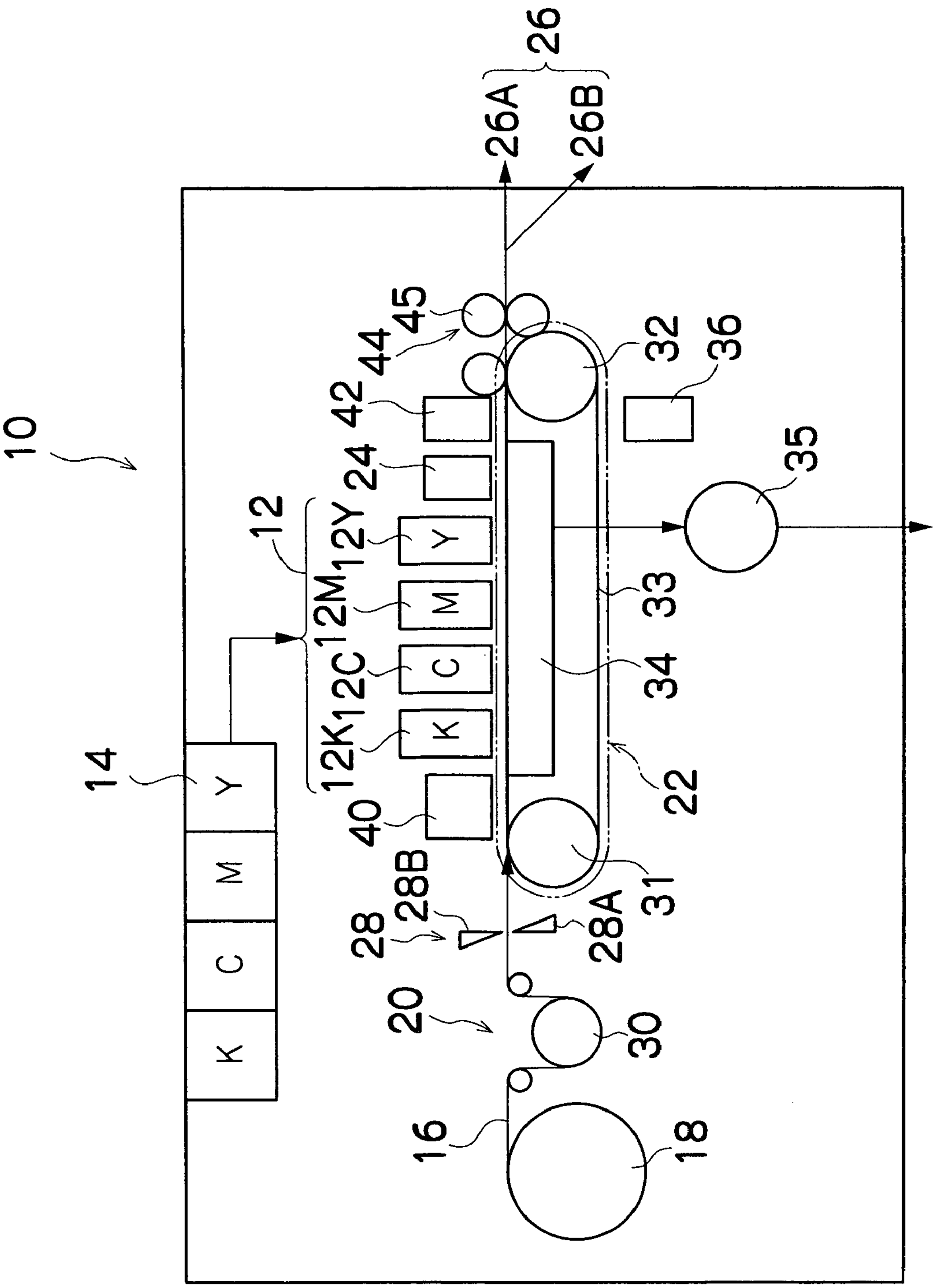
FIG. 1 is a general schematic drawing of an inkjet recording apparatus with a print head according to an embodiment of the present invention.

FIG. 1 is a diagram of the general composition of an inkjet recording apparatus according to an embodiment of the present invention. As shown in FIG. 1, the inkjet recording apparatus 10 comprises: a printing unit 12 having a plurality of print heads (recording devices) 12K, 12C, 12M, and 12Y for ink colors of black (K), cyan (C), magenta (M), and yellow (Y), respectively; an ink storing and loading unit 14 for storing inks of K, C, M, and Y to be supplied to the print heads 12K, 12C, 12M, and 12Y, a paper supply unit 18 for supplying recording paper (recording medium) 16; a decurling unit 20 for removing curl in the recording paper 16 supplied from the paper supply unit 18; a suction belt conveyance unit 22 disposed facing the nozzle face (ink-droplet ejection face) of the printing unit 12, for conveying the recording paper 16 while keeping the recording paper 16 flat; a print determination unit (reading device) 24 for reading the printed result produced by the printing unit 12; and a paper output unit 26 for outputting printed recording paper 16 (printed matter) to the exterior.

Though a magazine for rolled paper (continuous paper) is shown as an example of the paper supply unit 18 in FIG. 1, a plurality of magazines with papers of different paper width and quality may be jointly provided. Moreover, papers may be supplied in cassettes that contain cut papers loaded in layers and that are used jointly or in lieu of magazines for rolled papers.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink droplet ejection is controlled so that the ink droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite to the curl direction in the magazine. In this case, the heating temperature is preferably controlled in such a manner that the recording paper 16 has a curl in which the surface on which the print is to be made is slightly rounded in the outward direction.

In the case of the configuration in which roll paper is used, a cutter (a first cutter) 28 is provided as shown in FIG. 1, and the continuous paper is cut into a desired size by the cutter 28. The cutter 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the side adjacent to the printed surface across the conveyance path. When cut paper is used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction restrictors (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and this suction chamber 34 provides suction with a fan 35 to generate a negative pressure, thereby holding the recording paper 16 onto the belt 33 by suction.

The belt 33 is driven in the clockwise direction in FIG. 1 by the motive force of a motor (not shown in FIG. 1, but shown as a motor 88 in FIG. 5) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with a cleaning roller such as a brush roller and a water absorbent roller, an air blow configuration in which clean air is blown onto the belt 33, or a combination of these.

In the case of the configuration in which the belt 33 is nipped with the cleaning roller, it is preferable to make the linear velocity of the cleaning roller different to that of the belt 33, in order to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
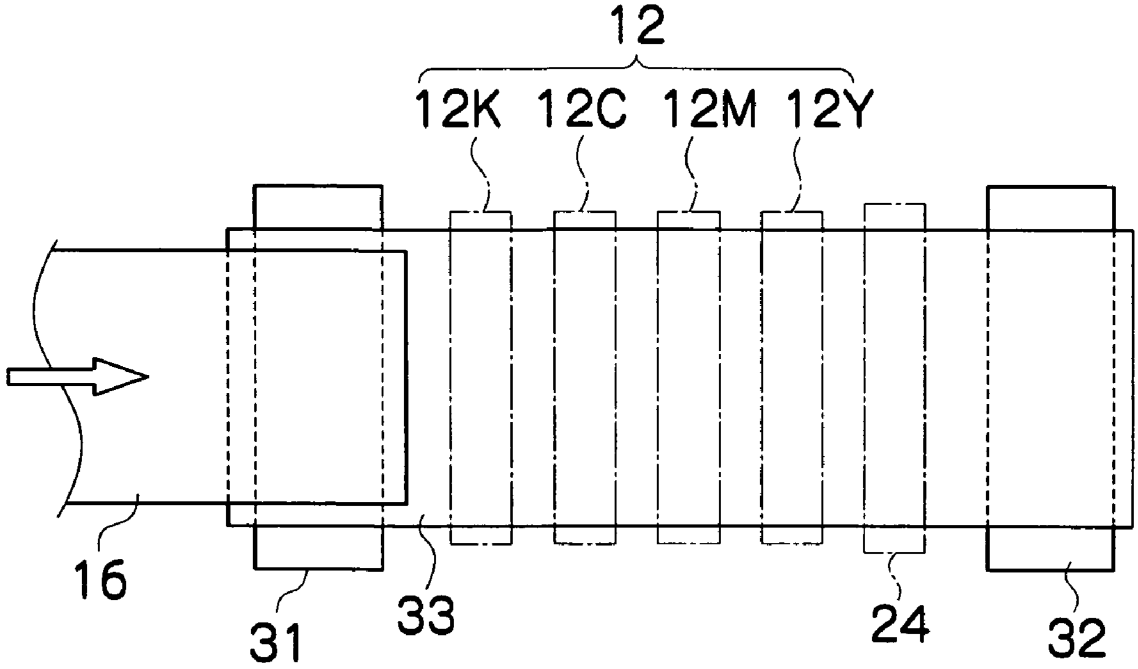
FIG. 2 is a plan view of principal components of an area around a printing unit of the inkjet recording apparatus in FIG. 1.

As shown in FIG. 2, the printing unit 12 is a so-called "full line head" in which a line head having a length corresponding to the maximum paper width is arranged in a direction (main scanning direction) that is perpendicular to the conveyance direction of the recording paper (hereinafter, referred to as the recording paper conveyance direction). A specific structural example is described later with reference FIGS. 3A to 3C, and FIG. 4. Each of the print heads 12K, 12C, 12M, and 12Y is composed of a line head, in which a plurality of ink ejection ports (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in the order of black (K), cyan (C), magenta (M), and yellow (Y) from the upstream side, along the paper conveyance direction. A color print can be formed on the recording paper 16 by ejecting the inks from the print heads 12K, 12C, 12M, and 12Y, respectively, onto the recording paper 16 while conveying the recording paper 16.

The printing unit 12, in which the full-line heads covering the entire width of the paper are thus provided for the respective ink colors, can record an image over the entire surface of the recording paper 16 by performing the action of moving the recording paper 16 and the printing unit 12 relatively to each other in the sub-scanning direction just once (i.e., with a single sub-scan). Higher-speed printing is thereby made possible and productivity can be improved in comparison with a shuttle type head configuration in which a print head reciprocates in the main scanning direction.

Although a configuration with four standard colors KMCY is described in the present embodiment, the combinations of the ink colors and the number of colors are not limited to these, and light and/or dark inks can be added as required. For example, a configuration is possible in which print heads for ejecting light-colored inks such as light cyan and light magenta are added.

As shown in FIG. 1, the ink storing and loading unit 14 has tanks for storing inks of the colors corresponding to the respective print heads 12K, 12C, 12M, and 12Y, and the tanks are connected to the print heads 12K, 12C, 12M, and 12Y through a channel (not shown), respectively. The ink storing and loading unit 14 has a warning device (e.g., a display device, an alarm sound generator) for warning when the remaining amount of any ink is low, and has a mechanism for preventing loading errors among the colors.

The print determination unit 24 has an image sensor for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric conversion elements with a width that is greater than the ink-droplet ejection width (image recording width) of the print heads 12K, 12C, 12M, and 12Y. This line sensor has a color separation line CCD sensor including a red (R) sensor row composed of photoelectric conversion elements (pixels) arranged in a line provided with an R filter, a green (G) sensor row with a G filter, and a blue (B) sensor row with a B filter. Instead of a line sensor, it is possible to use an area sensor composed of photoelectric conversion elements which are arranged two-dimensionally.

The print determination unit 24 reads an image printed by the print heads 12K, 12C, 12M, and 12Y of the respective colors, and determines each ejection of the print heads 12K, 12C, 12M, and 12Y. The ejection determination includes the presence of the ejection, measurement of the dot size, and measurement of the dot deposition position.

During ejection abnormality determination in the inkjet recording apparatus 10, a determination region is previously extracted from the image according to of the image data, and the ejection is determined for each print head 12K, 12C, 12M, and 12Y (the nozzles of each head) according to the results of reading in the image of the extracted region.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. Although not shown in FIG. 1, the paper output unit 26A for the target prints is provided with a sorter for collecting prints according to print orders.

Structure of Print Head

Next, the structure of a print head will be described. The print heads 12K, 12C, 12M, and 12Y of the respective ink colors have the same structure, and a reference numeral 50 is hereinafter designated to any of the print heads 12K, 12C, 12M, and 12Y.

Figure 3A:
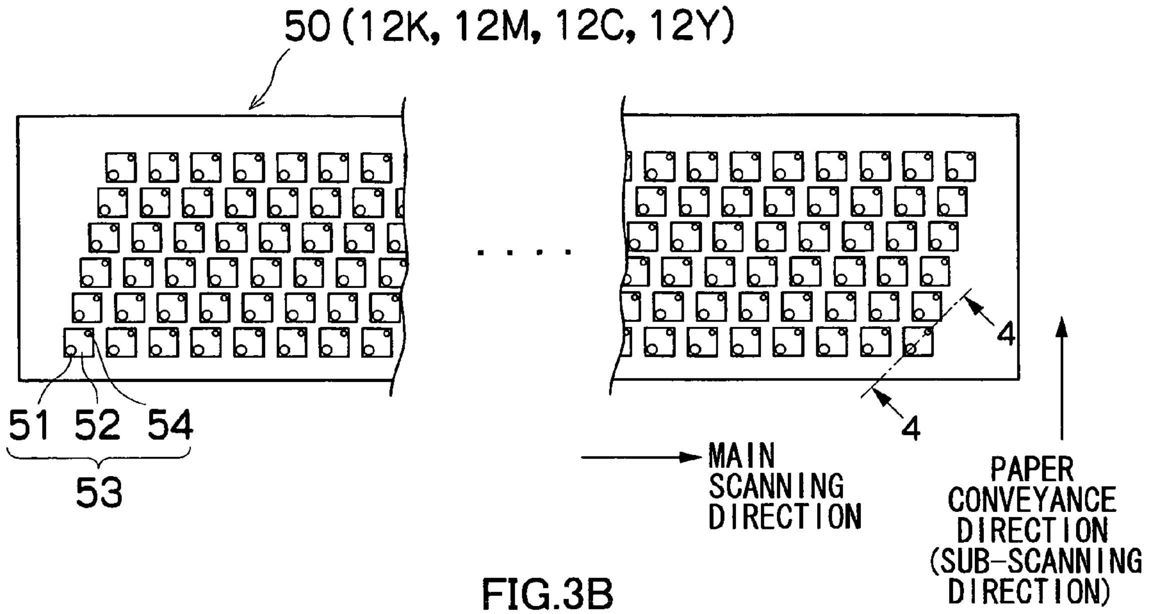
FIG. 3A is a perspective plan view showing an example of a configuration of a print head.
Figure 3B:
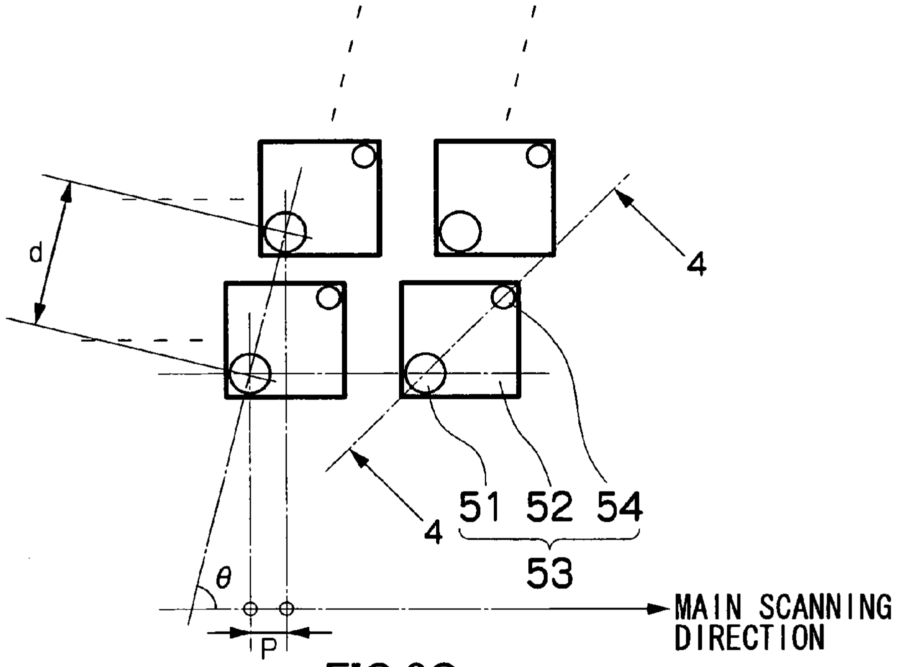
FIG. 3B is a partial enlarged view of FIG. 3A.

FIG. 3A is a plan view perspective view showing an example of a configuration of a print head 50, and FIG. 3B is a partial enlarged view of FIG. 3A. Furthermore, FIG. 3C is a plan view showing another example of the configuration of the print head 50, and FIG. 4 is a cross-sectional view showing a three-dimensional composition of an ink chamber unit (being a cross-sectional view along line 4-4 in FIGS. 3A and 3B).

In order to achieve a high density of the dot pitch printed onto the surface of the recording medium, it is necessary to achieve a high density of the nozzle pitch in the print head 50. As shown in FIGS. 3A to 3C and FIG. 4, the print head 50 in the present embodiment has a structure in which a plurality of ink chamber units 53, each comprising nozzles 51 for ejecting ink droplets and pressure chambers 52 corresponding to the nozzles 51, are disposed in the form of a staggered matrix, and the effective nozzle pitch is thereby made small.

More specifically, as shown in FIGS. 3A and 3B, the print head 50 according to the present embodiment is a full-line head having one or more nozzle rows in which a plurality of nozzles 51 for ejecting ink are arranged along a length corresponding to the entire width of the recording paper (recording medium) 16 in a direction substantially perpendicular to the conveyance direction of the recording paper.

Figure 3C:
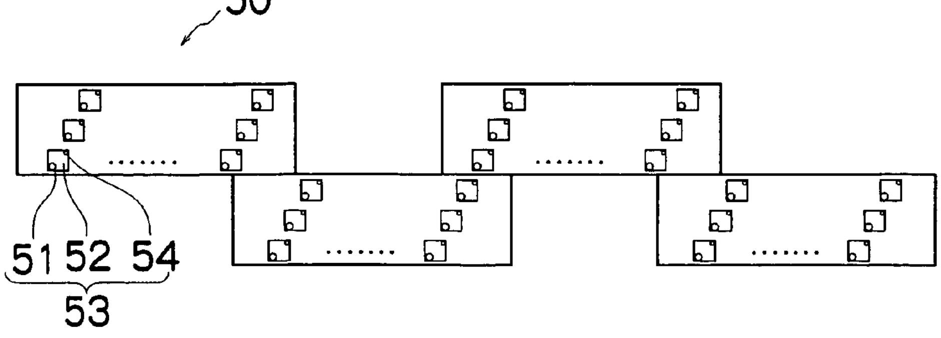
FIG. 3C is a perspective plan view showing another example of the configuration of the print head.
Figure 4:
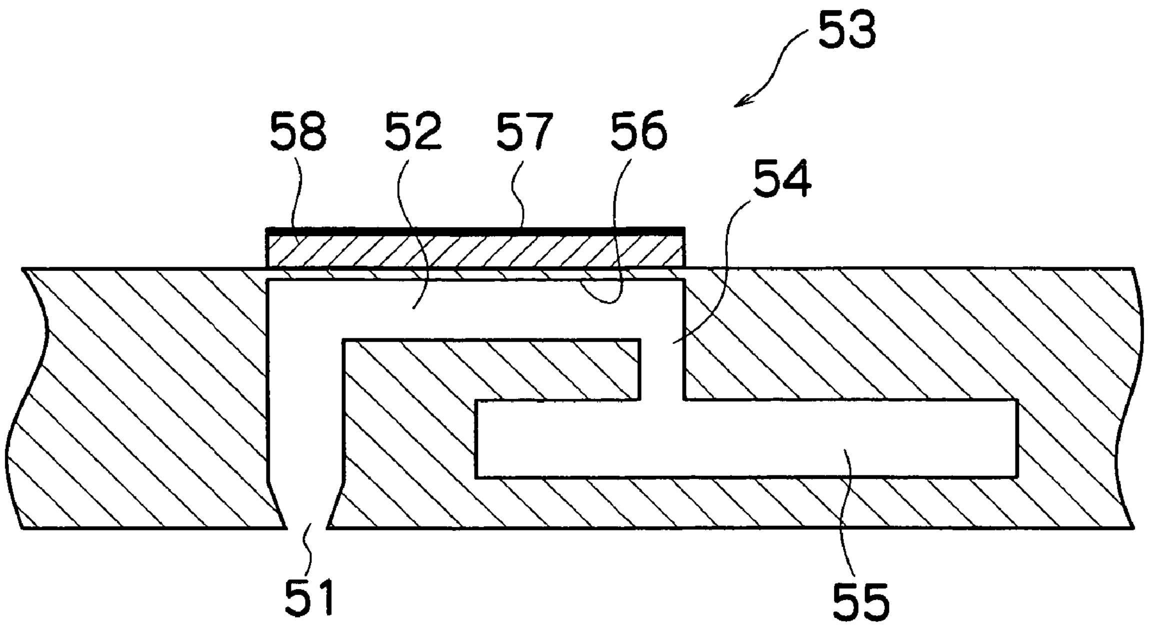
FIG. 4 is a cross-sectional view along a line 4-4 in FIGS. 3A and 3B.

Furthermore, as shown in FIG. 3C, it is also possible to use respective print heads 50' of nozzles arranged to a short length in a two-dimensional fashion, and to combine same in a zigzag arrangement, whereby a length corresponding to the full width of the print medium is achieved.

As shown in FIG. 4, the pressure chamber 52 provided corresponding to each of the nozzles 51 is approximately square-shaped in plan view, and a nozzle 51 and a supply port 54 are provided respectively at either corner of a diagonal of the pressure chamber 52. Each pressure chamber 52 is connected via a supply port 54 to a common flow channel 55.

An actuator 58 provided with an individual electrode 57 is joined to a pressure plate (diaphragm) 56 which forms the upper face of the pressure chamber 52. The actuator 58 is deformed when a drive voltage is supplied to the individual electrode 57, thereby causing ink to be ejected from the nozzle 51. When ink is ejected, new ink is supplied to the pressure chamber 52 from the common flow channel 55, via the supply port 54.

The plurality of ink chamber units 53 having such a structure are arranged in a grid with a fixed pattern in the line-printing direction along the main scanning direction and in the diagonal-row direction forming a fixed angle θ that is not a right angle with the main scanning direction, as shown in FIG. 3B. With the structure in which the plurality of rows of ink chamber units 53 are arranged at a fixed pitch d in the direction at the angle θ with respect to the main scanning direction, the nozzle pitch P as projected in the main scanning direction is $d \times \cos \theta$.

More specifically, the arrangement can be treated equivalently to one wherein the respective nozzles 51 are arranged in a linear fashion at uniform pitch P, in the main scanning direction. By means of this composition, it is possible to achieve a nozzle composition of high density, wherein the nozzle columns projected to an alignment in the main scanning direction reach a total of 2400 per inch (2400 nozzles per inch). Below, in order to facilitate the description, it is supposed that the nozzles 51 are arranged in a linear fashion at a uniform pitch (P), in the longitudinal direction of the head (main scanning direction).

In implementing the present invention, the arrangement of the nozzles is not limited to that of the example illustrated. For example, one nozzle row may be provided in the main scanning direction, or a plurality of nozzles may be arranged in the sub-scanning direction.

Generally, during printing or standby, if the use frequency of a particular nozzle 51 is low, and if it continues in a state of not ejecting ink for a prescribed time period or more, then the solvent of the ink in the vicinity of the nozzle evaporates and the viscosity of the ink increases. In a situation of this kind, it becomes impossible to eject ink from the nozzle 51, even if the actuator 58 is operated.

Therefore, before a situation of this kind develops (namely, while the ink is within a range of viscosity which allows it to be ejected by operation of the actuator 58), the actuator 58 is operated, and a preliminary ejection ("purge", "blank ejection", "liquid ejection", or "dummy ejection") is carried out in the direction of the cap (not shown, as ink receptacle), in order to expel the degraded ink (namely, the ink in the vicinity of the nozzle 51 which has increased viscosity).

Furthermore, if air bubbles have become mixed into the ink inside the print head 50 (inside the pressure chamber 52), then even if the actuator 58 is operated, it will not be possible to eject ink from the nozzle 51. In a case of this kind, the cap is placed on the print head 50, the ink (ink containing air bubbles) inside the pressure chambers 52 is removed by suction, by means of a suction pump (not shown), and the ink removed by suction is then supplied to a recovery tank (not shown).

This suction operation is also carried out in order to remove degraded ink having increased viscosity (hardened ink), when ink is loaded into the head for the first time, and when the head starts to be used after having been out of use for a long period of time. Since the suction operation is carried out with respect to all of the ink inside the pressure chambers 52, the ink consumption is considerably large. Therefore, desirably, preliminary ejection is carried out while the increase in the viscosity of the ink is still minor.

Description of Control System

Figure 5:
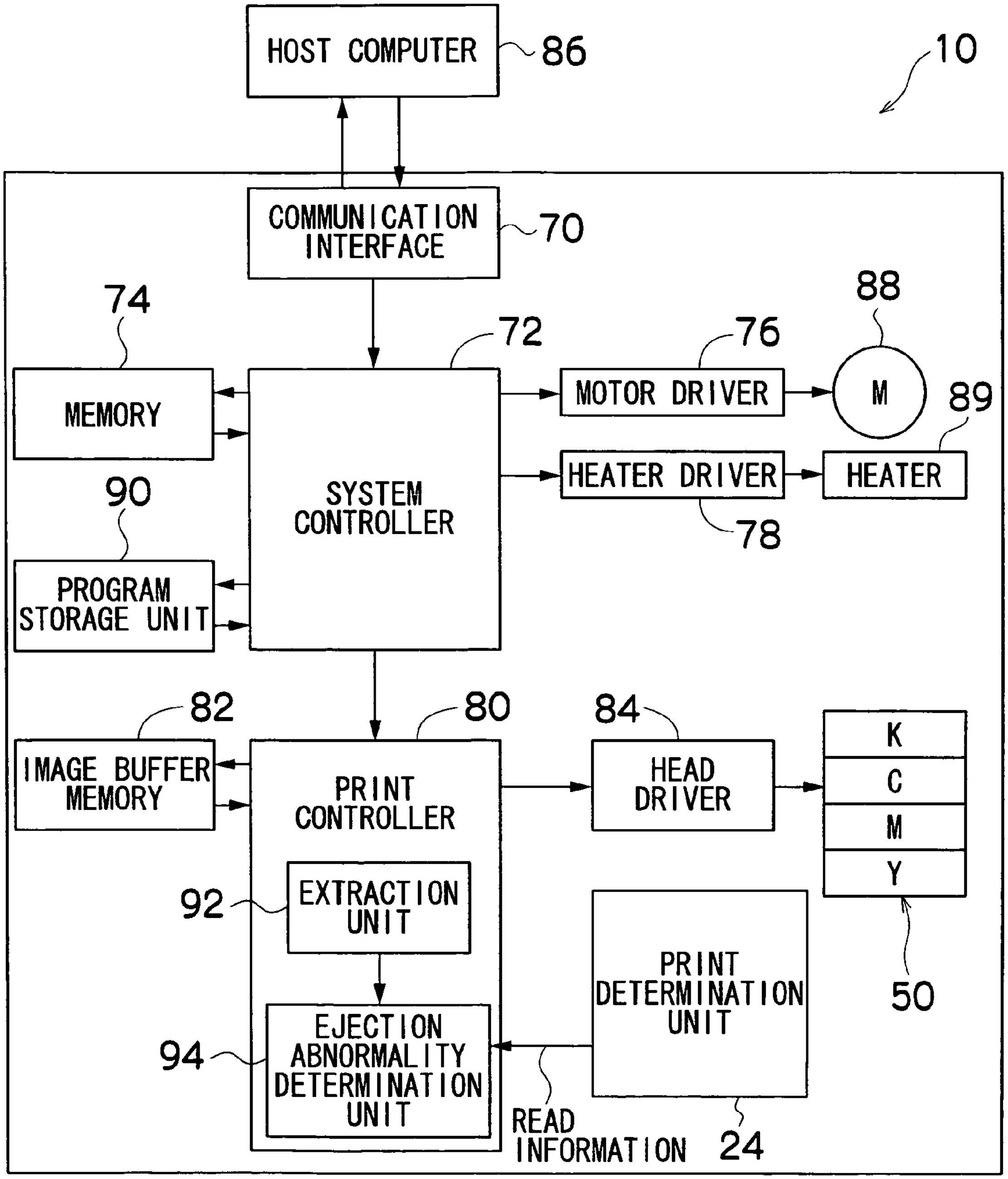
FIG. 5 is a principal block diagram showing the system configuration of the inkjet recording apparatus.

FIG. 5 is a principal block diagram showing the system configuration of the inkjet recording apparatus 10. The inkjet recording apparatus 10 comprises a communication interface 70, a system controller 72, a memory 74, a motor driver 76, a heater driver 78, a print controller (drive controlling device) 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the memory 74.

The memory 74 is a storage device for temporarily storing images inputted through the communication interface 70, and data is written and read to and from the memory 74 through the system controller 72. The memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, memory 74, motor driver 76, heater driver 78, and the like, as well as controlling communications with the host computer 86 and writing and reading to and from the memory 74, and it also generates control signals for controlling the motor 88 and heater 89 of the conveyance system.

The program executed by the CPU of the system controller 72 and the various types of data which are required for control procedures are stored in the memory 74. The memory 74 may be a non-writeable storage device, or it may be a rewriteable storage device, such as an EEPROM. The memory 74 is used as a temporary storage region for the image data, and it is also used as a program development region and a calculation work region for the CPU.

The motor driver 76 drives the motor 88 in accordance with commands from the system controller 72. The heater driver 78 drives the heater 89 of the post-drying unit 42 or the like in accordance with commands from the system controller 72.

The print controller 80 has a signal processing function for performing various tasks, compensations, and other types of processing for generating print control signals from the image data stored in the memory 74 in accordance with commands from the system controller 72 so as to supply the generated dot data to the head driver 84. Prescribed signal processing is carried out in the print controller 80, and the ejection amount and the ejection timing of the ink droplets from the respective print heads 50 are controlled via the head driver 84 according to the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 5 is one in which the image buffer memory 82 accompanies the print controller 80; however, the memory 74 may also serve as the image buffer memory 82. Also possible is an aspect in which the print controller 80 and the system controller 72 are integrated to form a single processor.

The image data to be printed is externally inputted through the communication interface 70, and is stored in the memory 74. At this stage, RGB image data is stored in the memory 74.

The image data stored in the memory 74 is sent to the print controller 80 via the system controller 72, and is converted to dot data (image information) for each ink color by the print controller 80. In other words, the print controller 80 performs processing for converting the input RGB image data into dot data for four colors, K, C, M, and Y. The dot data generated by the print controller 80 is stored in the image buffer memory 82.

The head driver 84 drives the actuators 58 of the print heads 12K, 12C, 12M, and 12Y of the respective colors KCMY according to the dot data supplied by the print controller 80. The head driver 84 can be provided with a feedback control system for maintaining constant drive conditions for the print heads.

Various control programs are stored in a program storage unit 90, and a control program is read out and executed in accordance with commands from the system controller 72.

The program storage unit 90 may use a semiconductor memory, such as a ROM, EEPROM, or a magnetic disk, or the like. An external interface may be provided, and a memory card or PC card may also be used. Naturally, a plurality of these storage media may also be provided.

Incidentally, the program storage unit 90 may also be combined with a storage device for storing operational parameters, and the like (not shown).

In addition, the print controller 80 further comprises an extraction unit 92 which extracts from the image a particular density region which satisfies a condition that the distance between mutually adjacent dots is equal to or greater than a prescribed value (a region in which the dots are respectively isolated), according to the dot data (image information).

In the inkjet recording apparatus 10, the particular density region extracted by the extraction unit 92 is set as the region in which ejection abnormalities are to be determined, and the print determination unit 24 reads in the dots constituting the image of the particular density region in the actual image.

Furthermore, according to the read information (read results) obtained by the print determination unit 24, an ejection abnormality determination unit 94 provided in the print controller 80 determines a state of the respective ejection elements (recording elements) constituted respectively by a nozzle 51 (and the ejection side flow channel which connects the nozzle 51 with the pressure chamber), a pressure chamber 52, a supply side flow channel including a supply port 54, an actuator 58 forming a drive element, and the like.

In other words, the ejection abnormality determination unit 94 determines whether or not a particular ejection element is in an ejection abnormality state, by comparing the dot data with the read information. The detail description of ejection abnormality determination is described later.

Figure 6:
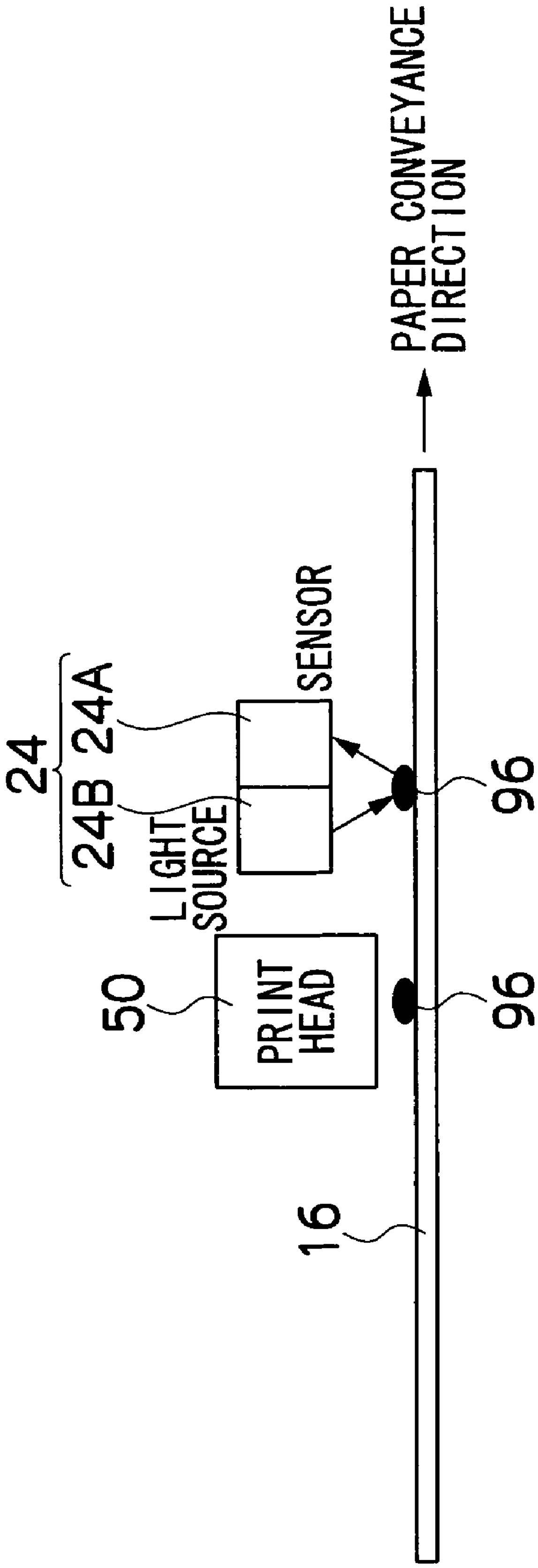
FIG. 6 is a principal schematic drawing showing the detailed composition of a print determination unit.

As shown in FIG. 6, the print determination unit 24 is a block comprising a line sensor unit 24A and a light source 24B. When light from the light source 24B is irradiated onto an image (dots 96) printed on recording paper 16 by means of ink droplets ejected from the print head 50, the sensor unit 24A reads in the light reflected by the recording paper 16. After the read light is subjected to prescribed signal processing, the print situation (presence or absence of ejection, variation in droplet ejection, and the like) is determined, and then the determination results are supplied to the print controller 80.

Furthermore, the print controller 80 makes various corrections with respect to the print head 50 according to the read information obtained from the print determination unit 24, as required.

A photoreceptor element (photoelectrical transducer), such as a CCD, CMOS, phototransistor, or the like, is used for the line sensor unit 24A shown in FIG. 6. In addition, a variety of light sources can be used as the light source 24B, depending on the type of photoreceptor element used for the sensor unit 24A, such as an LED, infrared light source, halogen lamp, metal halide lamp, fluorescent lamp, or the like.

First Embodiment

Next, an abnormal nozzle determination function contained in the inkjet recording apparatus 10 according to a first embodiment of the present invention will be described. For example, the types of nozzle abnormality that can be determined by this abnormal nozzle determination function include: soiling of the ink ejection surface on which the nozzles 51 are formed; increased viscosity of the ink inside the nozzles 51 due to drying; breakdown or malfunction of the actuators 58; electrical faults due to disconnection of the wiring which supplies drive signals to the actuators 58 or abnormality in an element of the drive circuit; infiltration or foreign matter or air bubbles into the ejection elements; transformation of the ink inside the ejection elements; and so on.

Figure 7:
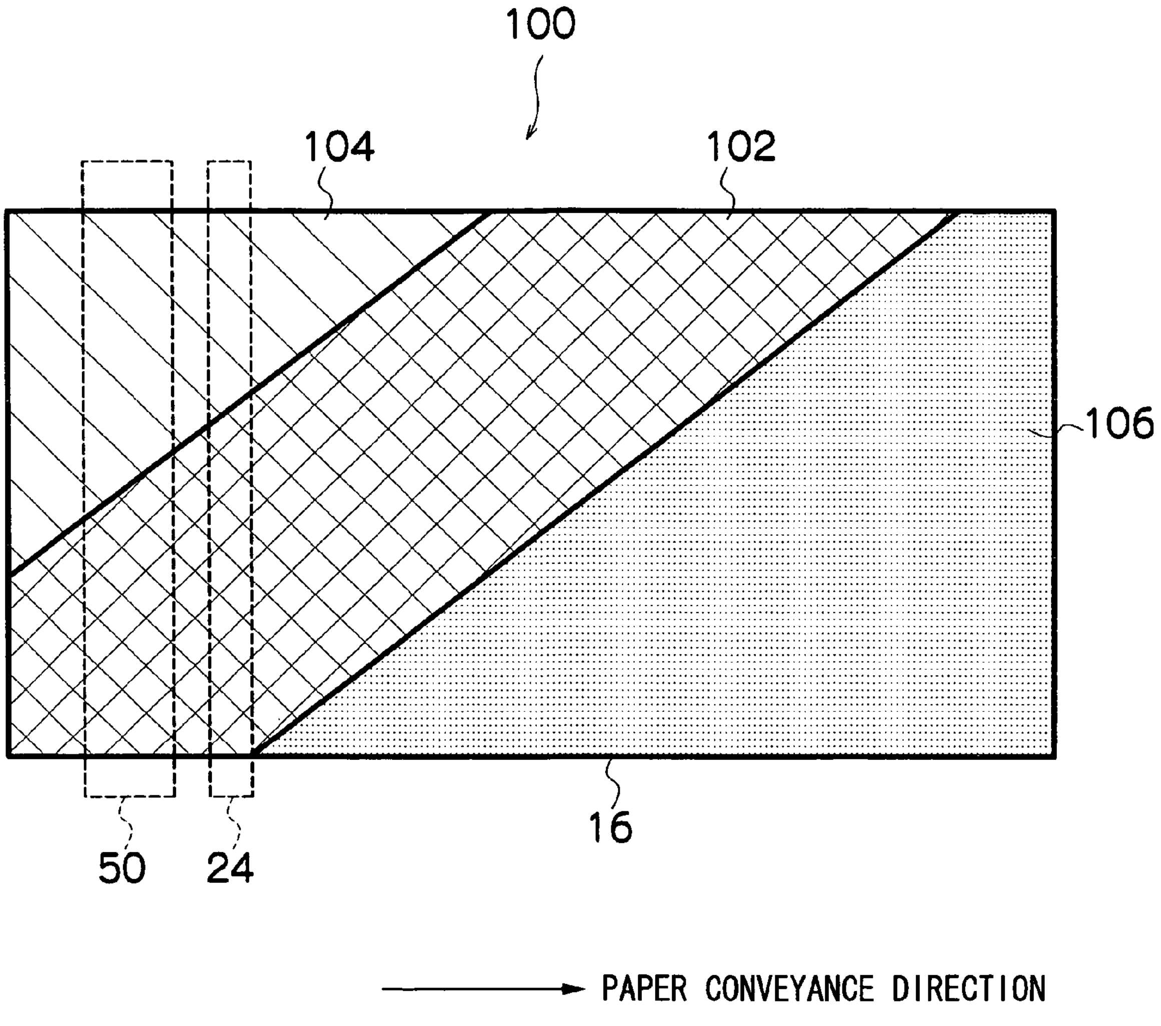
FIG. 7 is a conceptual diagram illustrating a low-density region.

FIG. 7 shows an image 100 formed on the recording paper 16 by means of ink ejected from a print head 50. The image 100 is constituted by a high-density region 102 (indicated by diagonal grids in FIG. 7) in which the distance between the edges of mutually adjacent dots is less than one-half of the dot diameter; a low-density region 104 (indicated by diagonal lines in FIG. 7) in which the distance between the edges of mutually adjacent dots is equal to or greater than one-half of the dot diameter (the adjacent dots is positioned in an isolated fashion in such a manner that they do interfere with each other); and a very-low-density region 106 (indicated by dotted shading in FIG. 7) in which the distance between the edges of mutually adjacent dots is greater than the dot diameter (in other words, the dots are positioned in a dispersed fashion).

In FIG. 7, the reference numeral 24 shown in the broken line denotes the print determination unit shown in FIGS. 1 and 2, and the reference numeral 50 denotes the print head shown in FIGS. 2, and 3A to 3C. Furthermore, the direction indicated by an arrow indicates the paper conveyance direction. Herein, unless specified otherwise, the low-density region 104 indicates a region including a low-density region 104 and a very-low-density region 106.

Figure 8:
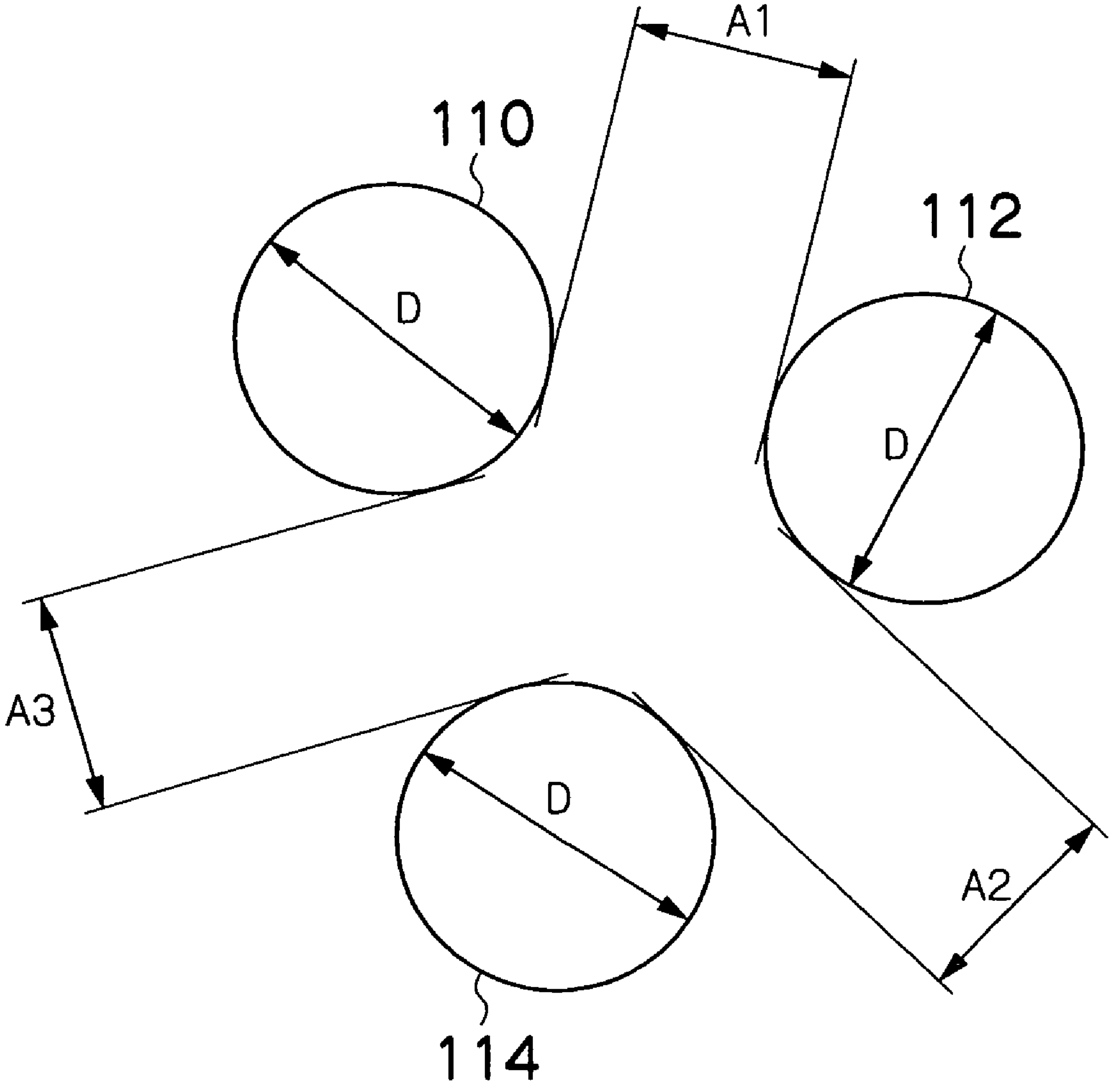
FIG. 8 is a diagram showing the dot arrangement of the low-density region illustrated in FIG. 7.

FIG. 8 shows three dots 110, 112 and 114 which are located in mutually adjacent positions in the low-density region 104 shown in FIG. 7. The diameter D of the dots (dot diameter) is uniform. The distance A1 between the dot edges of the dot 110 and the dot 112, the distance A2 between the dot edges of the dot 112 and the dot 114, and the distance A3 between the dot edges of the dot 110 and the dot 114 respectively satisfy a following relationships: A1>D/2, A2>D/2, and A3>D/2.

In the print controller 80 shown in FIG. 5, when dot data is generated from the image data supplied by the system controller 72, a low-density region 104 satisfying a condition that the distances A1, A2, and A3 between the adjacent dots are greater than ½ of the dot diameter D, is extracted by the extraction unit 92 according to the dot data, as shown in FIG. 8, and this low-density region 104 is set as an ejection abnormality determination region.

When the print determination unit 24 reads in the image 100 shown in FIG. 7, read information for the low-density region 104 is selectively acquired from the read information. The ejection abnormality determination unit 94 determines ejection abnormalities in the nozzles corresponding to the low-density region 104, by comparing the dot data of the low-density region 104 with the read information of the low-density region 104 acquired in this manner.

Modes for selectively acquiring read information for the low-density region 104 include: a mode in which information is read in by operating only the sensors of the print determination unit 24 which correspond to the determination region; and a mode in which information is read in by operating all of the (relevant) sensors in the print determination unit 24 so that a determination signal is acquired from the sensors corresponding to the low-density region 104 only. Either or these modes, or other modes, may be adopted.

Also, the print determination unit 24 may be controlled so as to read in only the low-density region 104.

Furthermore, when the adjacent dots are of different diameters in such a manner that the diameter of dot 110 is D' (where D>D'), the distance between dot edges which is used to judge a low-density region 104 may be taken to be D/2 or D'/2. However, the distance between the dot edges is preferably taken to be D'/2 which is based on the smaller dot diameter D' of the two dots, so as to prevent determination efficiency from reducing.

In this way, a low-density region 104 suitable for reading in dots from an image 100 is extracted, and the read information for the dots in the low-density region 104 thus extracted is acquired selectively. Thereby, it is possible to process the read information at greater speed, and also to simplify the composition of the processing circuit (processing unit) which handles the read information.

Herein, the "mutually adjacent dots" include dots which are formed by inks of different colors. In other words, when the dot 110 is a dot formed by magenta (M) ink while the dot 112 is a dot formed by cyan (C) ink, the region that the distance between those dots 110 and 112 is ½ of the dot diameter is extracted as a low-density region 104, for example. Therefore, since the interference between the dots formed by inks of different colors can avoided, it is possible to achieve more accurately to read in the dots.

Moreover, by adopting a composition in which the adjacent dots include dots of different colors so that the dots are read in regardless of their color, a monochrome type sensor can be used as the sensor unit 24A of the print determination unit 24, rather than providing the sensor unit 24A corresponding to each of RGB colors (red, green, and blue colors). Therefore, it is possible to simplify the composition of the determination system and the processing of read-in information.

Now, the reading characteristics of the sensor unit 24A of the print determination unit 24 will be described.

In this inkjet recording apparatus 10, when the ink ejection volume is 2 pl, the diameter D of the respective dots is between 25 to 30 μm. When forming dots of this kind, there is a possibility that a positional displacement of approximately 2 to 3 μm occurs in each of the dots.

For example, in the case in which the positional displacements of 3 μm occur in the approaching direction between respective dots while the dots are formed at 6 μm closer distance than the distance between the dots which are formed ideally, since the dots are arranged so that the distance between the dot edges of mutually adjacent dots is set to 12 μm (in other words, approximately ½ of the dot diameter) in consideration of a margin which is two times the maximum error value of 6 μm, it is possible to read in mutually adjacent dots accurately without any overlapping between the respective dots, even if there are variations in droplet ejection.

Figure 9:
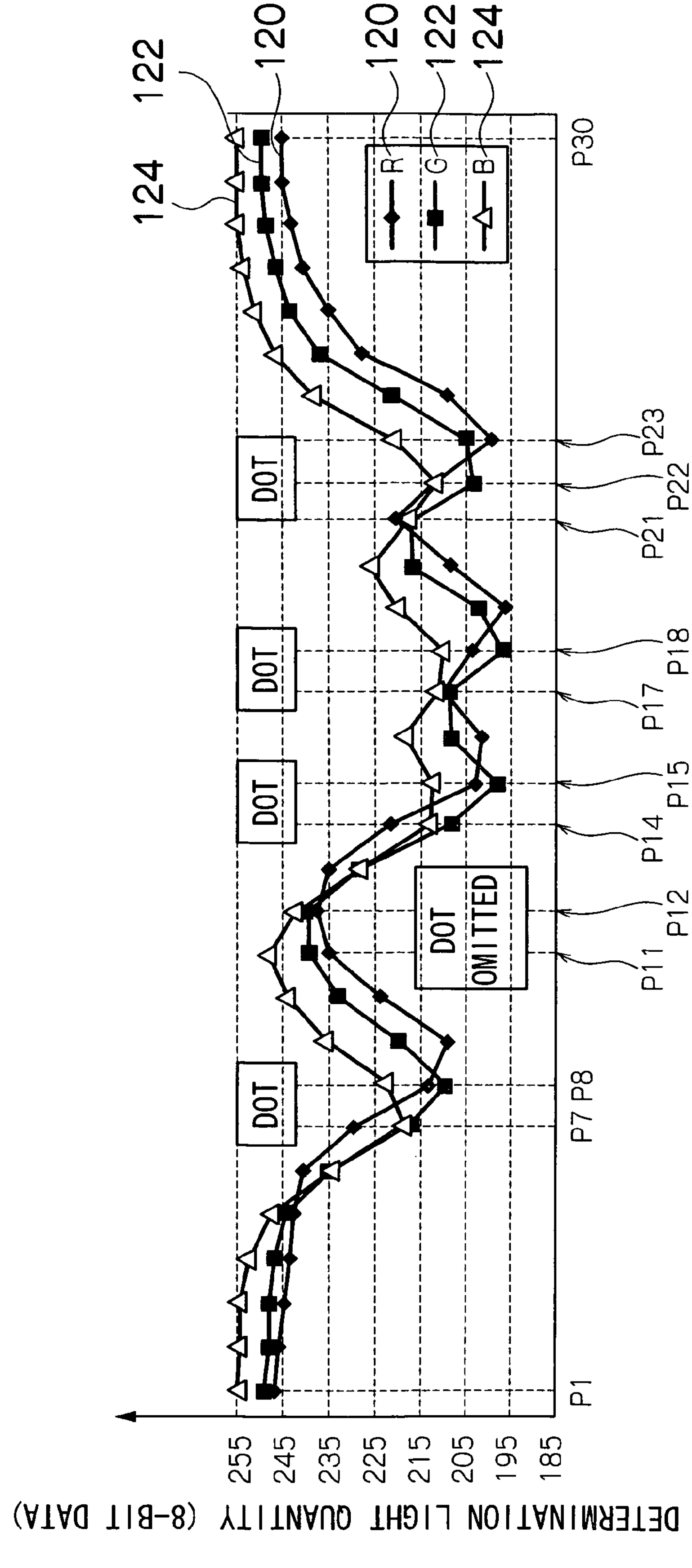
FIG. 9 is an illustrative diagram showing resolution of the print determination unit.

FIG. 9 shows results obtained by a sensor unit 24A having an RGB sensor (line sensor) of 1600 dpi resolution, when the sensor unit 24A reads in a dot row that one dot is missing from a row of five dots of black ink which has a diameter of 25 μm and is aligned at edge-to-edge distances of 25 μm.

In FIG. 9 the horizontal axis indicates pixels of the sensor (where the pixel pitch is 15.8 μm), and the vertical axis indicates the determination light quantity (values of the determination signal). The curve (determination light quantity graph) 120, which is obtained by linking the determination light quantity values for the respective pixels to each other, shows the determination light quantities of the R sensor, the graph 122 shows the determination light quantities of the G sensor, and the curve 124 shows the determination light quantities of the B sensor. Those determination light quantities are expressed in the form of 8-bit data (data having a value between 0 and 255). In other words, while the value of the determination light quantity in a pixel which is separated from a dot is almost 255, the determination light quantity tends to decline as the pixel position approaches a dot.

The pixels determining the dots are pixels corresponding to the minimum values of the determination light quantity graphs 120, 122, and 124. However, in consideration of the sensor determination error, the sensor pixel pitch, and the distance between dot edges, at least one of the adjacent pixels corresponding to the minimum values of the determination light quantity graphs 120, 122, and 124 is a pixel that a dot is determined to be present.

In the present embodiment, the dots are arranged in the dot data on the determination region between the pixels P7 and P8, the determination region between the pixels P11 and P12, the determination region between the pixels P14 and P15, the determination region between the pixels P17 and P18, and the determination region between pixels P21 and P22.

As shown in FIG. 9, in the determination region between the pixels P7 and P8, the determination region between the pixels P14 and P15, the determination region between the pixels P17 and P18, and the determination region between the pixels P21 and P22, those pixels are pixels that the respective determination light quantity graphs of the R, G, and B pixels have a minimum value, or are pixels adjacent to pixels having a minimum value, and therefore, it is found that the dots can be determined.

On the other hand, since the determination light quantity graphs 120, 122 and 124 have maximum values in the pixels P11 and P12, it is found that no dot is determined. In this case, since the resolution of the sensor unit 24A of the print determination unit 24 is set to 1600 dpi, it is possible to read in accurately each dot of a dot row in which dots of 25 μm diameter are arranged at a distance between dot edges of 25 μm.

Incidentally, the resolution of the print determination unit 24 shown in FIG. 9 is simply one example, and the resolution of the print determination unit 24 is governed by the dot diameter of the dots to be determined, the distance between a dot under inspection and adjacent dots, and so on.

Figure 10:
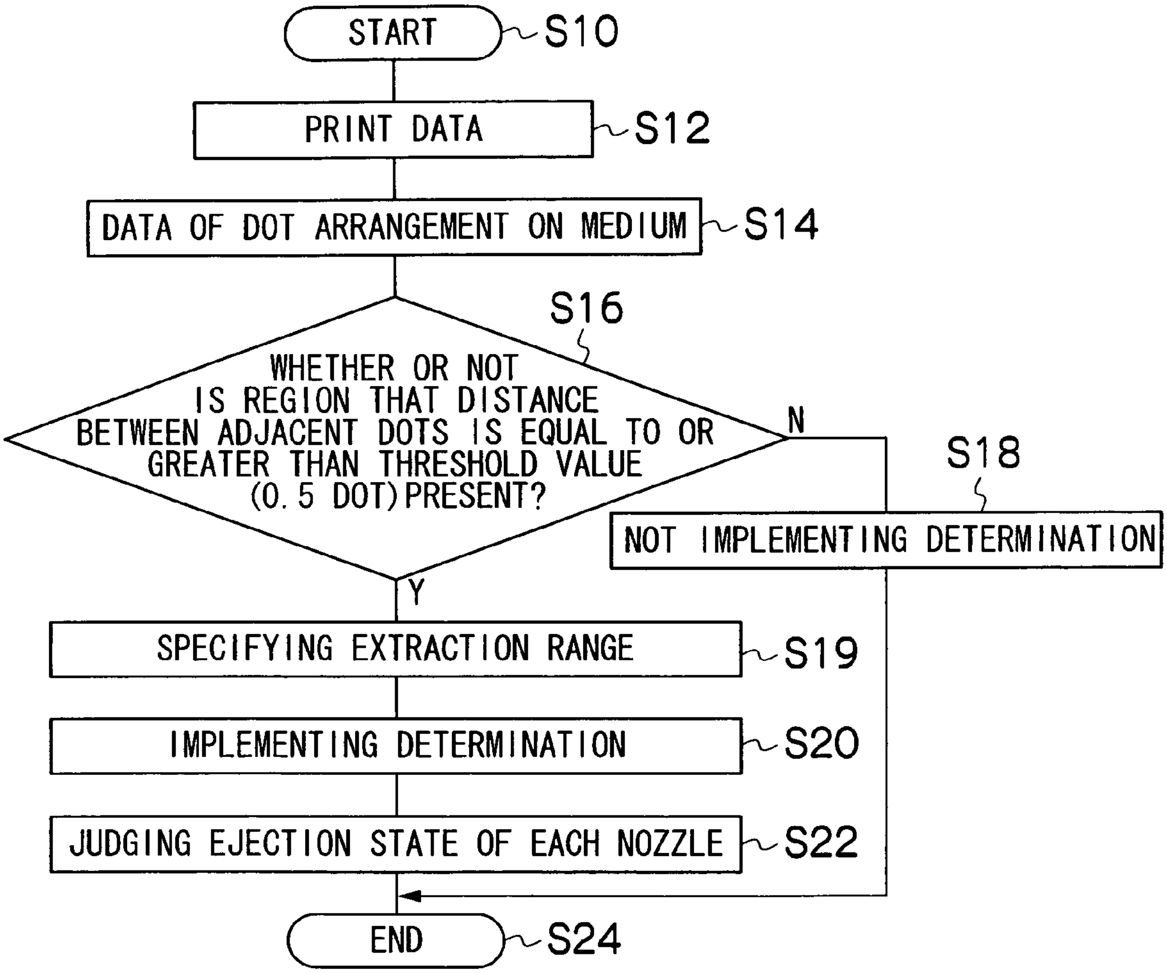
FIG. 10 is a flowchart showing a control sequence of ejection abnormality determination according to a first embodiment of the present invention.

FIG. 10 is a flowchart showing a control sequence of the ejection abnormality determination process described above.

As shown in FIG. 10, when the ejection abnormality determination control sequence starts firstly (a step S10), print data (image data) is supplied from the system controller 72 in FIG. 5 to the print controller 80 (a step S12 in FIG. 10), and then the print controller 80 generates dot arrangement data (dot data) relating to the recording paper (recording medium) 16 (a step S14).

Next, it is judged whether or not this dot data satisfies a condition in which the distance between the edges of adjacent dots is equal to or greater than a prescribed threshold value (namely, ½ of the dot diameter) (a step S16).

In other words, at the step S16, a region is extracted from the dot data according to an extraction condition in which the distance between dot edges is equal to or greater than ½ of the dot diameter.

If there is no region which satisfies the aforementioned extraction condition (NO judgment), then the image is not read in (ejection abnormality determination is not carried out) (a step S18), and the ejection abnormality determination control sequence terminates (a step S24).

On the other hand, if there is a region that satisfies the extraction condition at the step S16 (YES judgment), then the extraction region (extraction range) is determined (a step S19), and this extraction region is set as the ejection abnormality determination region. Next, the image is read in by the print determination unit 24, and then the read information for the extracted region is obtained from the read results (read information) (a step S20). Then, the read information of the extracted region is subjected to prescribed signal processing, and the ejection abnormality determination unit 94 shown in FIG. 5 determines the state of the respective nozzles (a step S22 in FIG. 10), so that the ejection abnormality determination control sequence terminates (the step S24).

Now, one example of processing to a nozzle determined to be an ejection abnormality at the step S22 will be described. In the nozzle determined to be the ejection abnormality (ejection abnormality nozzle), driving of the nozzle is halted, and then other nozzles adjacent to the ejection abnormality nozzle are controlled so that corrective ejection is performed.

Modes of corrective ejection by other adjacent nozzles include: a mode in which the dot size is enlarged in comparison to the prescribed size by increasing the number of ejection operations; and a mode in which the dot size is enlarged in comparison to the prescribed size by increasing the volume of ink ejected from the adjacent nozzles. By performing corrective ejection of this kind, it is possible to suppress the occurrence of striping or non-uniformity which is caused by an ejection abnormality occurring in a particular nozzle.

Furthermore, a print matter of degraded image quality is discarded by dividing off a print matter in which there is a possibility that the nozzle producing an ejection abnormality has been used. Additionally, in an interval between printing operations, the ejection abnormality nozzle is controlled so that a maintenance operation (restoration operation), such as preliminary ejection, suctioning, or the like, is carried out in order that the ejection abnormality nozzle is restored.

In an inkjet recording apparatus 10 composed as described above, a low-density region 104 is extracted from an image according to the dot data generated from the image, read information for the low-density region 104 is acquired selectively from the read information obtained by the print determination unit 24, and then ejection abnormalities for nozzles corresponding to the low-density region 104 are identified according to the read information for the low-density region 104. Therefore, since interference between adjacently positioned dots, and dots of different colors can be avoided, then it is possible to read in the dots desirably, thereby enabling ejection abnormality nozzles to be determined accurately. Furthermore, since the read information for the low-density region 104 is acquired selectively, it is possible to speed up the processing of the read information, and to simplify the composition of the processing circuit (data processing device).

Incidentally, when forming a plurality of print matters having the same image, ejection abnormality determination is only carried out for particular nozzles, and the use frequency of particular nozzles is low, thereby causing ejection abnormalities. Therefore, it is desirable to control printing so that the image is rotated (for example, inverted) every certain number of prints in order to distribute the nozzle determination frequency and the use frequency.

Second Embodiment

Next, a second embodiment of the present invention will be described.

In ejection abnormality determination according to the present embodiment, when satisfying the extraction condition that the distance between dot edges is equal to or greater than ½ of the dot diameter by moving all or a portion of the dots constituting a high-density region 102 in which the distance between dot edges is less than ½ of the dot diameter in the first embodiment described above (in other words, when all or a portion of a high-density region can be changed into a low-density region), the dot arrangement is modified by means of a restricted image processing table so that the distance between the edges of adjacent dots is equal to or greater than ½ of the dot diameter, and then ejection abnormalities are determined in respect of the nozzles corresponding to the newly created low-density region (the region which has been changed to low density).

In this case, instead of moving dots, it is also possible to delete the dots, or to combine both movement of dots and deletion of dots.

Figure 11A:
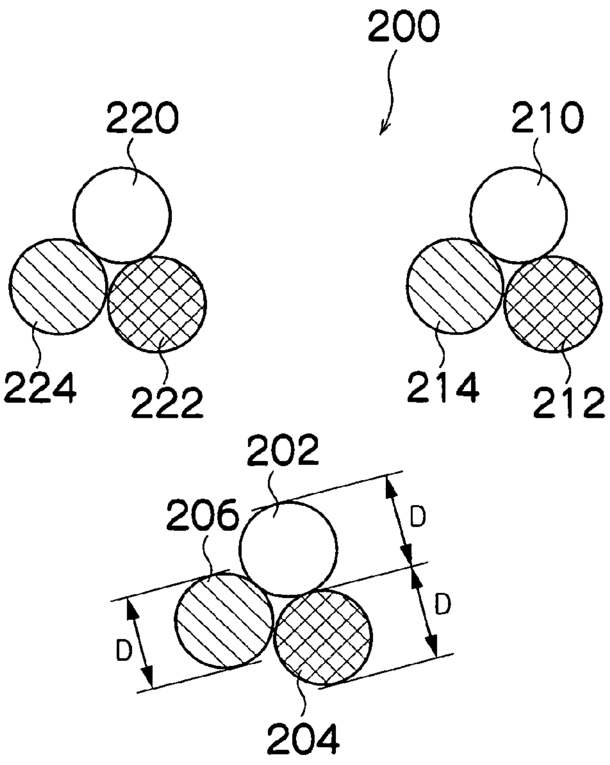
FIGS. 11A and 11B are illustrative diagrams showing a concept of modifying a dot arrangement for ejection abnormality determination according to a second embodiment of the present invention.

In other words, three dots 202, 204, and 206 shown in FIG. 11A, which have a uniform diameter D and have a positional relationship that the external perimeters (edges) of the dots are touching (namely, the distances between the edges of the dots are virtually zero), form a high-density region 102 that the distance between dot edges is equal to or less than ½ of the dot diameter in the first embodiment described above, thereby this region 102 being excluded from determination of ejection abnormalities.

Figure 11B:
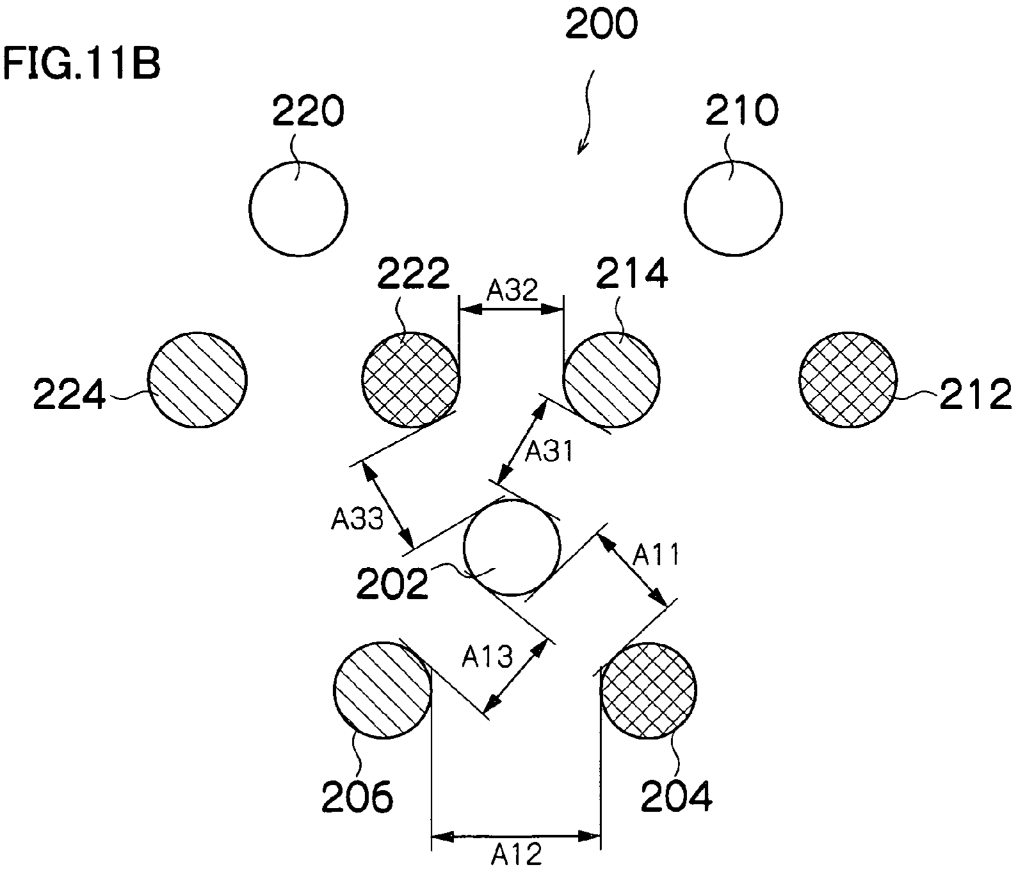

However, in the present embodiment, it is judged whether or not the dot arrangement can be modified by moving all or a portion of the three dots 202, 204 and 206 shown in FIG. 11A, in such a manner that the distances A11, A12 and A13 between the respective dot edges shown in FIG. 11B satisfy following conditions: A11>D/2, A12>D/2, and A13>D/2, respectively. If the dot arrangement can be modified in the conditions, then the dot arrangement of the three dots in FIG. 11A arranged so as to be virtually touching is modified in such a manner that the distances between the dot edges are equal to or greater than ½ of the dot diameter as shown in FIG. 11B. Similarly, according to the dots 210, 212 and 214, and the dots 220, 222 and 224, the dot arrangement shown in FIG. 11A is also changed to the dot arrangement shown in FIG. 11B.

Furthermore, when the dots come closer to each other by modifying the dot arrangement, it is also necessary to consider the distance between the dot edges. In other words, the distances between the respective dot edges are set in such a manner that all of the distance A31 between the dots 202 and 214, the distance A32 between the dots 214 and 222, and the distance A33 between the dots 202 and 222 become equal to or greater than D/2. The distances between the edges of the respective dots shown in FIG. 11B may be a uniform distance or different distances.

Figure 12A:
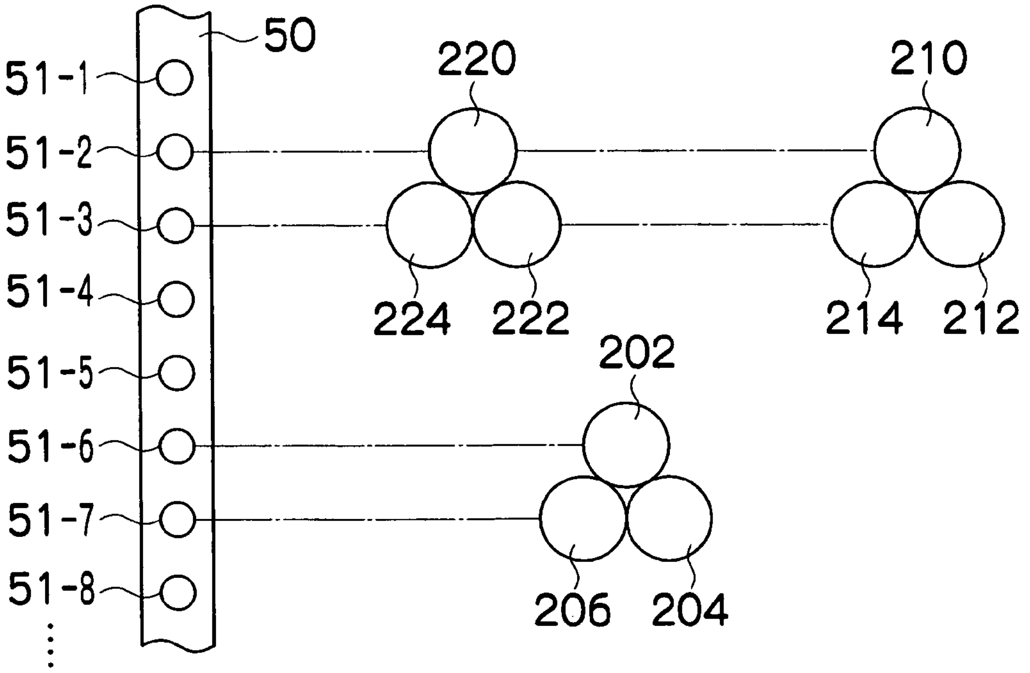
FIGS. 12A and 12B are illustrative diagrams showing a concept of changing the nozzles for ejection abnormality determination according to the second embodiment.
Figure 12B:
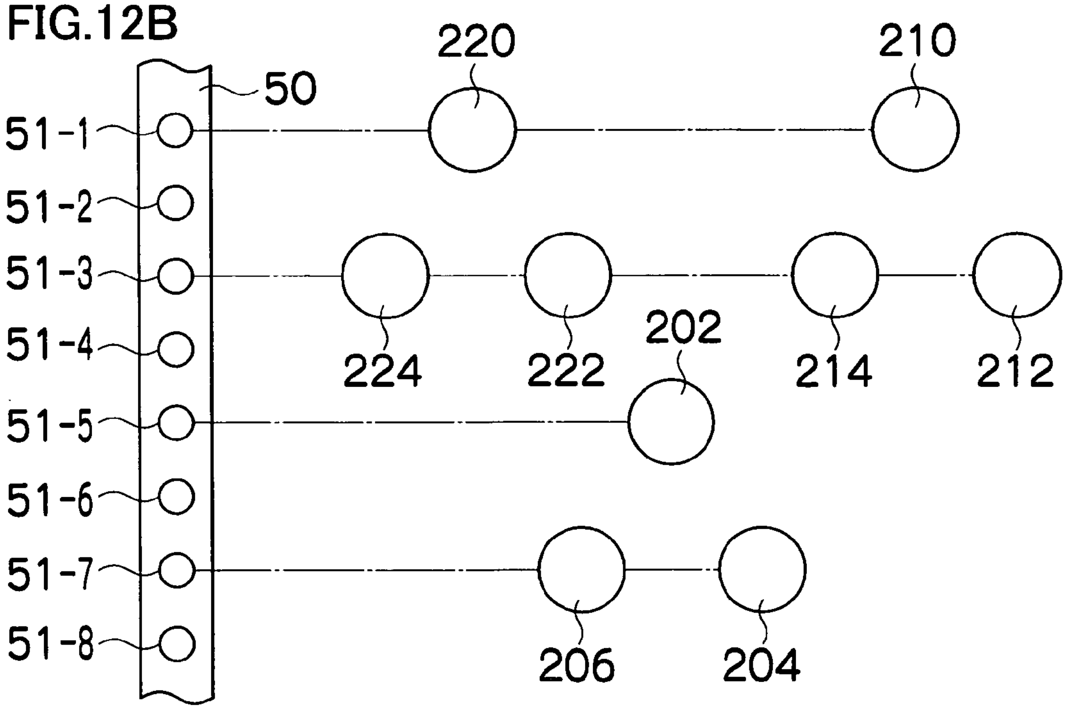

Now, the relationship between modifying the dot arrangement and the nozzles used for ejection will be described. FIGS. 12A and 12B shows the relationship between the nozzles 51 of the print head 50 and the dots shown in FIGS. 11A and 11B. In order to simplify the diagrams, it is assumed that the print head 50 shown in FIG. 12A and FIG. 12B has one nozzle row in which nozzles are aligned at a prescribed nozzle pitch (the nozzle pitch P shown in FIGS. 3A to 3C) in the breadthways direction of the recording paper 16. In addition, for the sake of convenience, the nozzles 51 are shown in order of nozzle 51-1, nozzle 51-2 . . . and nozzle 51-8 from the upper side in the FIGS. 12A and 12B.

The relationship between the dots and the nozzles is specified in such a manner that the dot 202 shown in FIG. 11A is formed by the ink ejected from the nozzle 51-6, and the dots 204 and 206 are formed by the ink ejected from the nozzle 51-7.

If the dot arrangement shown in FIG. 11A is modified to the dot arrangement shown in FIG. 11B, then the nozzle 51-6 which ejects the ink for forming the dot 202 is changed to the nozzle 51-5, as well as the nozzle 51-2 which ejects the ink for forming the dots 210 and 220 is changed to the nozzle 51-1. In this case, the droplet ejection timing is also modified appropriately with this modification in the dot arrangement.

Since the renewed ejection abnormality determination region is increased by modifying the dot arrangement as described above, it is possible to increase the number of nozzles subject to abnormality determination. In addition, since the nozzles 51 which have not been scheduled for use are used according to a result of modifying the dot arrangement, it is possible to perform ejection abnormality determination for the nozzles 51 which have been not scheduled for use.

In the present embodiment, it is judged whether or not the dot arrangement can be modified with respect to the high-density region 102 shown in FIG. 7, but of course, it is also possible to apply an image processing table which modifies the dot arrangement with respect to the low-density region 104 shown in first embodiment, in such a manner that the dots are formed by using the nozzles 51 which have not been scheduled for use.

In consideration of the effects on image quality, it is desirable that the region in which the dot arrangement is to be modified is selected preferentially in a region which lies outside the image position of the principal subject, or a region in the vicinity of the leading end of the image or the trailing end of the image. Furthermore, it is also desirable that the maximum value of dots movement relating to the modification in dot arrangement is specified previously. A plurality of maximum values may be provided for the amount of dots movement, depending on the content of the image.

On the other hand, in order to avoid the affecting image quality by modifying the dot arrangement, the control is preferably implemented so that a low-density region 104 having a low dot coverage rate per unit area (dot occupation surface area per unit area, or number of dots per unit area), which has margin for modifying the dot arrangement, is previously determined from the dot data, thereby modifying the dot arrangement in this low-density region 104.

The low-density region 104 may be a region in which the dot coverage rate per unit area is 50% or less. Furthermore, other parameters, such as the recording density, which can be derived from the dot data, may be employed instead of the dot coverage rate. Incidentally, in the present embodiment, the image density is 2400 dpi and the unit area is an area of 100 pixels×100 pixels.

Figure 13:
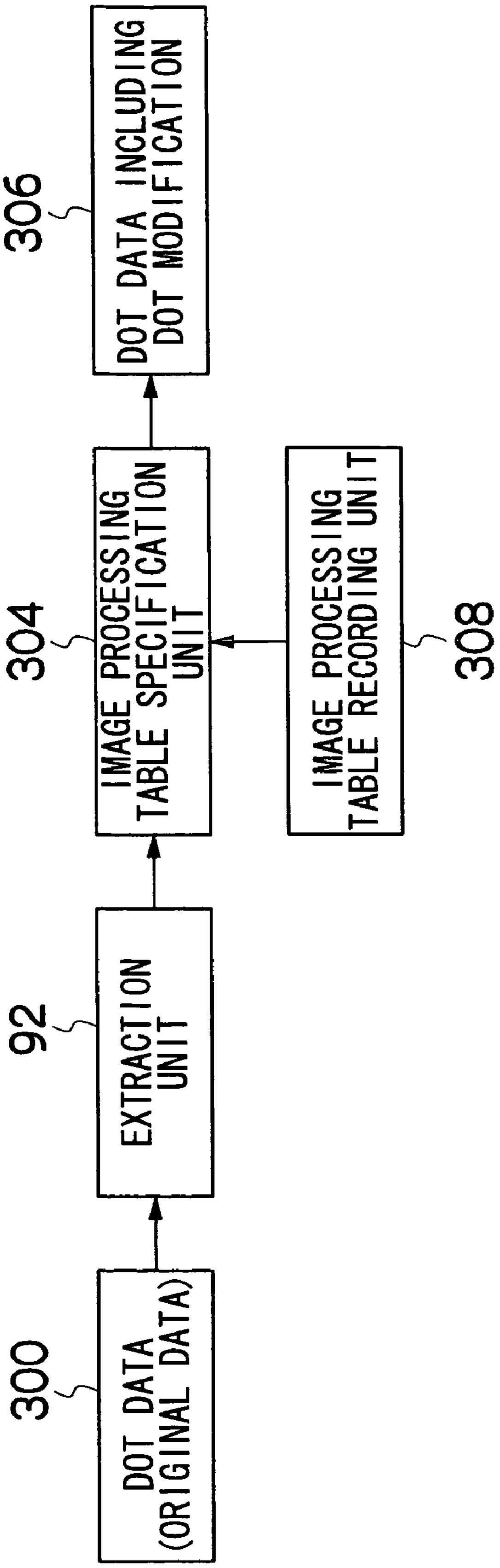
FIG. 13 is a principal block diagram showing composition of a dot arrangement modification unit according to the second embodiment.

FIG. 13 shows the composition of a processing block (dot arrangement modification processing unit) which implements processing for modifying the dot arrangement.

As shown in FIG. 13, according to the original dot data 300*a*, the extraction unit 92 shown in FIG. 5 extracts a region which satisfies the condition that the distance between the dot edges is equal to or greater than ½ of the dot diameter. On the other hand, if there is a region in which the distance between the dot edges is less than ½ of the dot diameter, then the extraction unit 92 extracts a region which can change the positions of the dots so as to satisfy the condition that the distance between the edges of the respective dots is equal to or greater than ½ of the dot diameter by modifying the dot arrangement.

In the region which can change the positions of the dots, the dot arrangement is modified by using an image processing table specified by an image processing table specification unit 304 in such a manner that the distance between the edges of the respective dots becomes equal to or less than ½ of the dot diameter, thereby generating dot data 306 containing the dots of which arrangement has been modified.

Incidentally, it is also possible to adopt a composition in which a plurality of image processing tables prepared in advance for modifying the dot arrangement are recorded in an image processing table recording unit 308 in such a manner that an image processing table suited to the original dot data and the extracted low-density region can be read out.

Figure 14:
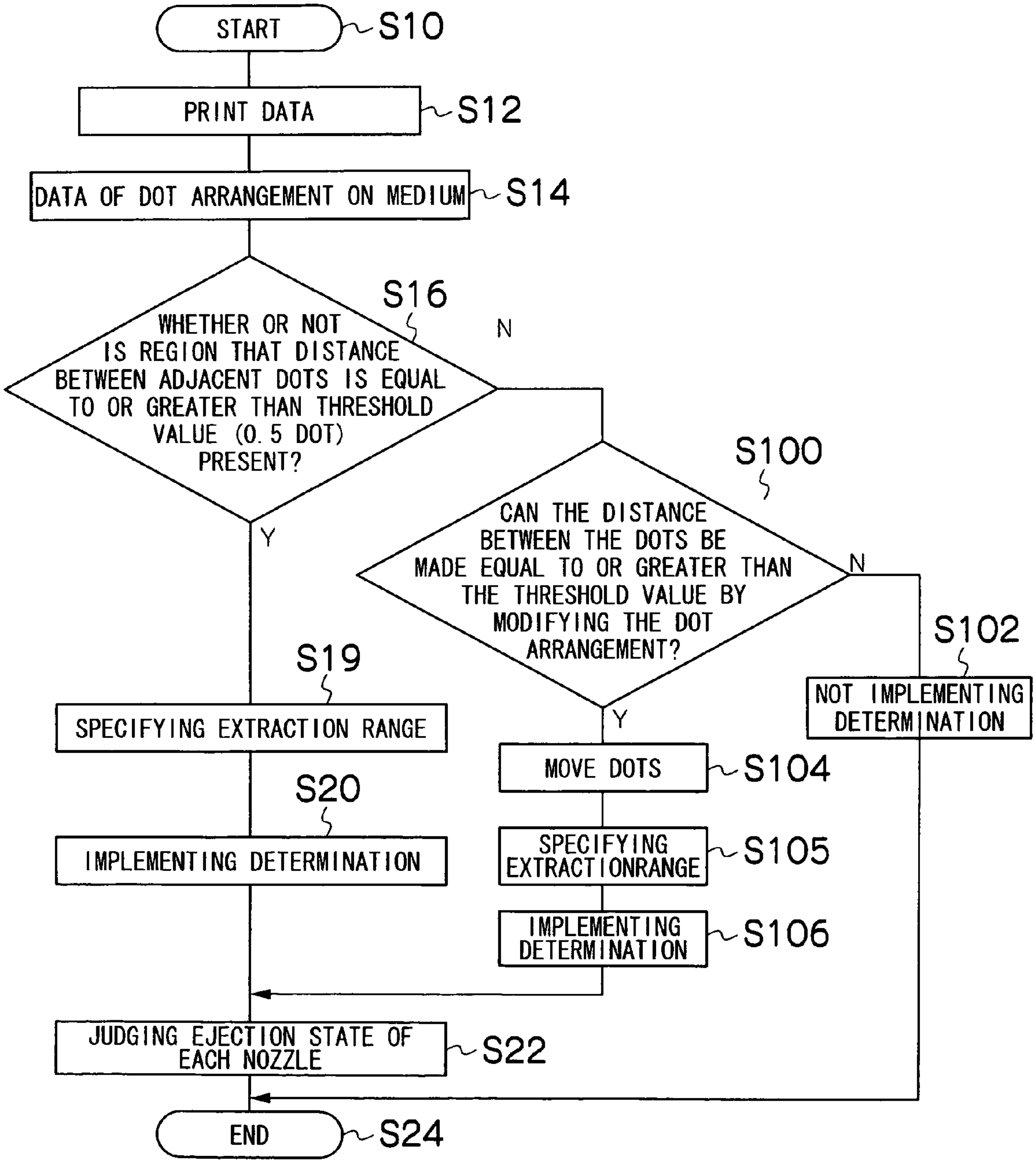
FIG. 14 is a flowchart showing a control sequence of ejection abnormality determination according to the second embodiment.

FIG. 14 is a flowchart showing a control sequence for ejection abnormality determination according to the present embodiment. In FIG. 14, items which are the same as or similar to those in FIG. 10 are labeled with the same reference numerals and description thereof is omitted here.

In the ejection abnormality determination control relating to the second embodiment, instead of the step S18 in FIG. 10, the extraction unit 92 shown in FIGS. 5 and 13 judges whether or not the dot arrangement can be modified so that the distance between dot edges satisfies the extraction condition at the step S16 (namely, the distance between dot edges is ½ or greater) (a step S100). When the aforementioned extraction condition is not satisfied even if the dot arrangement has been modified (in other words, when the modification of the dot arrangement is not possible) (NO judgment), ejection abnormality determination is not implemented (a step S102), and the ejection abnormality determination control sequence terminates (a step S24).

On the other hand, when the dot arrangement can be modified in such a manner that the extraction condition is satisfied at the step S100 (YES judgment), dot data in which the dot arrangement has been modified is generated by using an image processing table specified by an image processing table specification unit 304 shown in FIG. 13 (a step S104). Next, an extracted region (extracted range) is specified according to the dot data for which the dot arrangement has been modified (a step S105), and then ejection abnormality determination is carried out by taking this extracted region as the ejection abnormality determination region (a step S106).

Next, the sequence advances to the step S22 and the read information obtained at the step S106 is subjected to prescribed signal processing. Finally, the state of the respective nozzles is judged by the ejection abnormality determination unit 94 shown in FIG. 5, and then the ejection abnormality determination control is terminated (the step S24).

In an inkjet recording apparatus 10 having the composition described above, the dot arrangement is modified in a region which can modify the dot arrangement so as to satisfy an extraction condition (namely, that the distance between dot edges is equal to or greater than ½ of the dot diameter) according to a result of moving the dots, by using a special processing table. Therefore, since the dot arrangement is modified in a region in which the distance between dot edges is less than ½ of the dot diameter, it is possible to determine ejection abnormality of the nozzles corresponding to the region as well.

Furthermore, it is desirable to implement control so that nozzles which have not been scheduled for use are used when the dot arrangement is modified. Therefore, ejection abnormality determination can be carried out for nozzles which have not been scheduled for use.

Third Embodiment

Next, a third embodiment of the present invention will be described with reference to FIGS. 15A and 15B.

Figure 15A:
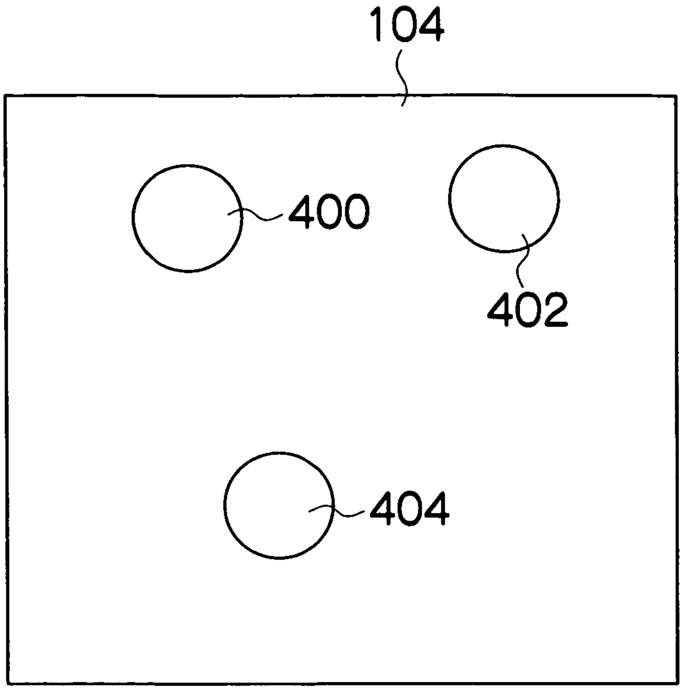
FIGS. 15A and 15B are illustrative diagrams showing a concept of adding dots for ejection abnormality determination according to a third embodiment of the invention.
Figure 15B:
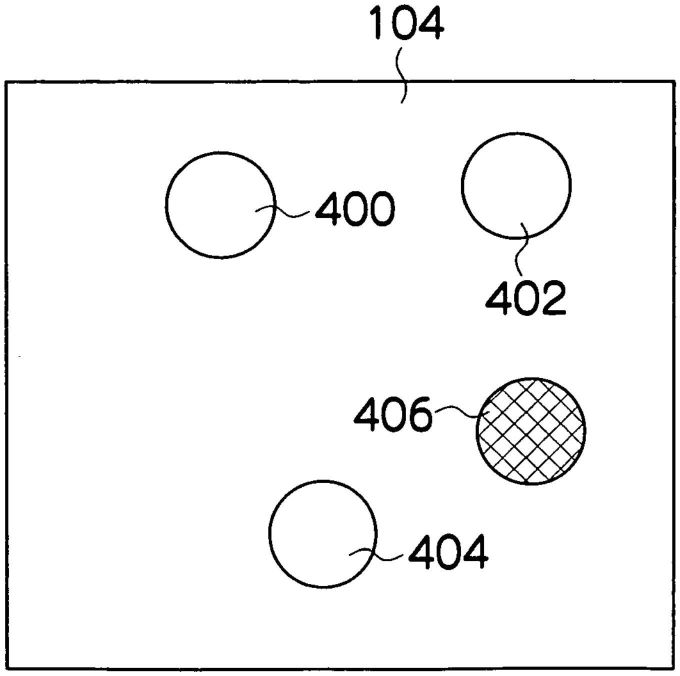

FIG. 15A shows a state in which three dots 400, 402, and 404 are positioned in the low-density region 104 shown in FIG. 7, and FIG. 15B shows a state in which a determination dot 406 is located at an inconspicuous position (namely, a region having very little effect on the image) in the low-density region 104 shown in FIG. 15A.

The determination dot 406 is positioned so that the distances between the dots 400, 402, and 404 are equal to or greater than ½ of the dot diameter.

When the determination dot 406 is formed in an inconspicuous position in the low-density region 104, then it is possible to increase the number of nozzles which determine ejection abnormality in one image. Incidentally, a plurality of determination dots 406 may be added into a range which does not affect the image or reading of the dots.

Furthermore, the size of the determination dots 406 is desirably the same as the size of minimum size dot which is situated in the image (or in the region to which the determination dots 406 have been added). Moreover, any color inks may be used to the determination dots 406.

Incidentally, it is also possible to adopt a mode in which the dot data is modified so that the determination dots 406 can be added to the low-density region 104 shown in FIG. 7, with combining the present embodiment with the second embodiment described above.

Fourth Embodiment

Next, a fourth embodiment of the present invention will be described. In the ejection abnormality determination according to the present embodiment, nozzles 51 to be determined are selected according to determination history data and use history data for the respective nozzles 51 (nozzle use history data, nozzle idle time data, and the like).

Figure 16:
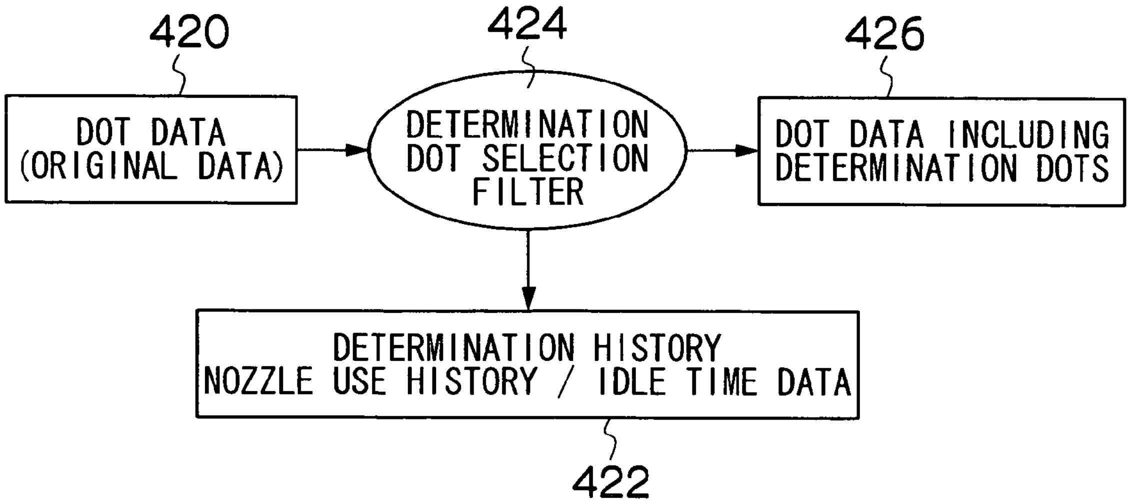
FIG. 16 is a principal block diagram showing composition of an ejection abnormality determination unit according to a fourth embodiment of the present invention.

FIG. 16 is a block diagram showing the composition of a block (ejection abnormality determination unit 94 in FIG. 10) which determines the ejection abnormality according to the present embodiment. As shown in FIG. 16, an original dot data 420 is converted into dot data 426 including determination dots, by using a determination dot selection filter 424 specified according to data recorded in a data recording unit (recording element information storage unit) 422 which records ejection abnormality determination history data and ejection history data for the respective nozzles 51.

In this case, it is also possible to adopt a composition in which a plurality of determination dot selection filters 424 prepared in advance are recorded in a determination dot selection filter recording unit in such a manner that a determination dot selection filter 424 can be selected according to the ejection history data, and the like.

Incidentally, the data recording unit 422 may record fault history of the nozzles 51 (ejection abnormality determination history), the locality thereof, and the like, in addition to the determination history data, the nozzle use history, and the nozzle rest history as described above.

Furthermore, the data recording unit 422 may also be combined with another memory (recording device), such as the memory 74, or image buffer memory 82 shown in FIG. 5. Desirably, the data recorded on the data recording unit 422 is updated at a prescribed timing, such as when the power supply is switched on or when recording of one image has been completed.

Figure 17:
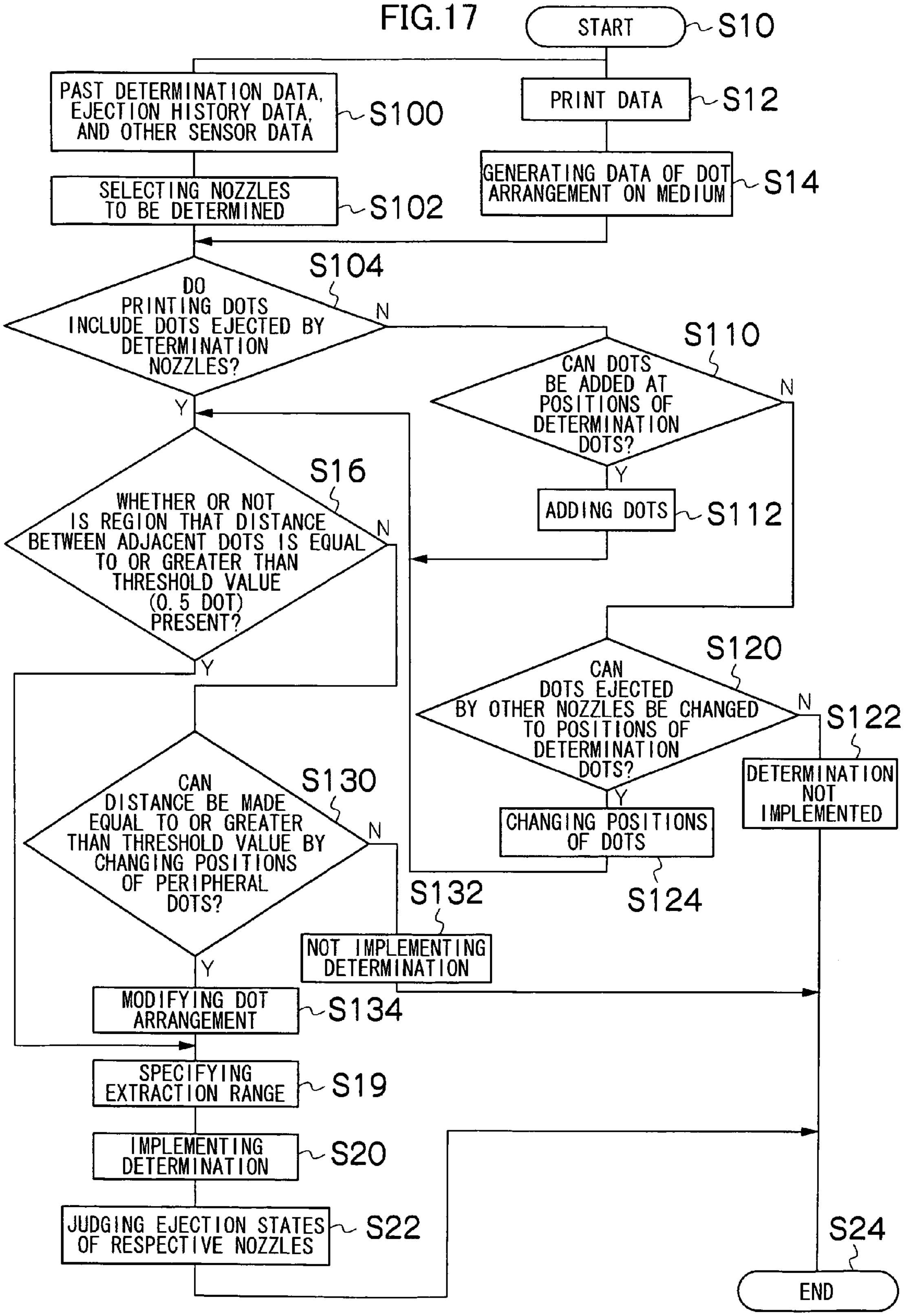
FIG. 17 is a flowchart showing a control sequence of ejection abnormality determination according to the fourth embodiment.

FIG. 17 is a flowchart showing a control sequence for ejection abnormality determination according to the present embodiment. In FIG. 17, items which are the same as or similar to those in FIG. 10 or FIG. 14 are labeled with the same reference numerals and description thereof is omitted here.

As shown in FIG. 17, firstly, the ejection abnormality determination control sequence is started (a step S10), and then dot data is generated at steps S12 and S14. On the other hand, determination history data and ejection history data recorded in the data recording device 422 shown in FIG. 16 are referred (a step S100 in FIG. 17), and then the abnormality nozzles which are to be determined are selected (a step S102).

Next, according to the generated dot data, it is judged whether or not the determination nozzles selected at a step S102 include nozzles to be used for image printing (a step S104). At the step 104, if the determination nozzles do include nozzles to be used for image printing (YES judgment), then the procedure advances to a step S16.

On the other hand, if the determination nozzles do not include nozzles to be used in printing an image at the step S104 (NO judgment), a judgment is made regarding whether or not it is possible to add the dots (for example, reference numeral 406 in FIG. 15B) at positions corresponding to the determination nozzles (in other words, determination dots) according to the extraction conditions (a step S110).

At the step S110, if it is determined that dots cannot be added at the positions of the determination dots (NO judgment), the procedure advances to a step S120. At the step S120, it is judged whether or not the dots corresponding to the nozzles adjacent to the determination nozzles can be moved to the positions of the determination dots, according to the extraction conditions at the step S16.

At the step S120, if it is judged that the dots corresponding to the nozzles adjacent to the determination nozzles cannot be moved to the positions of the determination dots (NO judgment), the dots corresponding to the determination nozzles are not set in the ejection abnormality determination region and these dots are not read in. Then, the procedure advances to a step S24, and the ejection abnormality determination control sequence terminates.

On the other hand, if it is judged that the dots corresponding to the nozzles adjacent to the determination nozzles can be changed to the positions of the determination dots at the step S120 (YES judgment), processing for changing the dot position (dot position changing process) is carried out in the dot data (a step S124), and then the procedure advances to the step S116.

Furthermore, if it is judged that dots can be added at the positions of the determination dots at the step S110 (YES judgment), processing for adding determination dots to the dot data (dot addition process) is carried out (a step S12), and then the procedure then advances to the step S16.

At the step S116, it is judged whether or not the extraction condition (namely, the condition that the distances between the edges of the determination dots and the adjacent dots be equal to or greater than ½ of the dot diameter) is satisfied, according to the original dot data and the data which is generated by carrying out the dot position changing process and the dot addition process. If the aforementioned condition is not satisfied (NO judgment), it is judged whether or not the condition is satisfied by modifying the dot arrangement in the periphery of the determination dots (a step S130).

Incidentally, the dot data generated after dot addition process and dot position changing process at steps S112 and S124 is dot data which satisfies the extraction condition in the step S16.

At the step S130, if the condition is not satisfied (NO judgment), ejection abnormality determination is not performed (a step S132). Finally, the procedure advances to a step S24, and then the ejection abnormality determination control sequence terminates.

On the other hand, if the extraction condition is satisfied at step S130 (YES judgment), the dot data which reflects a dot arrangement modification process is generated (a step S134). Then, when the procedure advances to step S20, the determination dots are read in, and the states of the determination nozzles are judged according to the read information (a step S24). Finally, the sequence advances to the step S24, and then the ejection abnormality determination control sequence terminates.

As described above, in the inkjet recording apparatus 10, determination nozzles are selected according to nozzle information, such as the use history of nozzles, and the like, and then ejection abnormality determination is carried out in respect of the selected nozzles. Therefore, abnormality determination can be implemented efficiently with respect to nozzles which are liable to produce abnormalities.

The embodiments of the present invention are described with respect to the example of an inkjet recording apparatus which records images onto a recording medium by means of ink ejected from nozzles provided in a print head, but the scope of application of the present invention is not limited to this, and it may also be applied to a broad range of image recording apparatuses, such as LED electrophotographic printers, which are equipped with recording elements other than nozzles, such as LEDs.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:

a recording device having a plurality of recording elements which record an image onto a recording medium;

an extraction device which extracts a region satisfying a prescribed extraction condition according to information of the image recorded on the recording medium by the recording device;

a reading device which reads in the image recorded on the recording medium and accordingly outputs read information; and a recording element abnormality determination device which determines abnormalities of the recording elements corresponding to the image in the extracted region extracted by the extraction device according to the read information of the region extracted by the extraction device, wherein:

each of the recording elements comprises: a plate having an ejection aperture which ejects droplets of a liquid onto the recording medium; a liquid chamber which accommodates the liquid to be ejected from the ejection aperture; an ejection side flow channel which connects the ejection aperture with the liquid chamber; and a supply side liquid flow channel which supplies the liquid to the liquid chamber, and the recording device includes a recording head having the recording elements.

2. The image recording apparatus as defined in claim 1, further comprising:

a selection device which selects the recording elements in which abnormality is determined according to information relating to the recording elements, wherein the recording element abnormality determination device determines abnormalities of the recording elements according to the read information of dots in the read information obtained by the reading device, the dots having been formed by the recording elements which are selected by the selection device.

3. An image recording apparatus, comprising:

a recording device having a plurality of recording elements which record an image onto a recording medium;

an extraction device which extracts a region satisfying a prescribed extraction condition according to information of the image recorded on the recording medium by the recording device;

a reading device which reads in the image recorded on the recording medium and accordingly outputs read information; and a recording element abnormality determination device which determines abnormalities of the recording elements corresponding to the image in the extracted region extracted by the extraction device according to the read information of the region extracted by the extraction device, wherein the extraction device extracts the region satisfying the extraction condition that a distance between edges of mutually adjacent dots forming the image is not less than ½ of diameter of each of the dots according to the information of the image.

4. The image recording apparatus as defined in claim 3, further comprising:

a selection device which selects the recording elements in which abnormality is determined according to information relating to the recording elements, wherein the recording element abnormality determination device determines abnormalities of the recording elements according to the read information of dots in the read information obtained by the reading device, the dots having been formed by the recording elements which are selected by the selection device.

5. An abnormal recording element determination method for an image recording apparatus comprising a recording device having a plurality of recording elements which record an image onto a recording medium, the method comprising the steps of:

extracting a region satisfying a prescribed extraction condition according to information of the image recorded on the recording medium by the recording device;

reading in the image recorded on the recording medium and accordingly outputting read information; and determining abnormalities of the recording elements corresponding to the image in the extracted region extracted at the extracted step according to the read information of the extracted region extracted at the extracting step, wherein the read information satisfying the extraction condition that a distance between edges of mutually adjacent dots forming the image is not less than ½ of diameter of each of the dots according to the information of the image.

6. An abnormal recording element determination method for an image recording apparatus comprising a recording device having a plurality of recording elements which record an image onto a recording medium, the method comprising the steps of:

extracting a region satisfying a prescribed extraction condition according to information of the image recorded on the recording medium by the recording device;

reading in the image recorded on the recording medium and accordingly outputting read information;

determining abnormalities of the recording elements corresponding to the image in the extracted region extracted at the extracting step according to the read information of the extracted region extracted at the extracting step; and storing the determined abnormalities as abnormality determination history data for each of the recording elements;

wherein, the stored abnormality determination history data is used to determine when subsequent recording element use will produce abnormal image recording results.

* * * * *